United States Patent
Su et al.

(10) Patent No.: US 12,368,930 B2
(45) Date of Patent: Jul. 22, 2025

(54) BULLET-SCREEN COMMENT DISPLAY

(71) Applicant: SHANGHAI BILIBILI TECHNOLOGY CO., LTD., Shanghai (CN)

(72) Inventors: Zhenyu Su, Shanghai (CN); Yun Zhang, Shanghai (CN); Yusheng Dong, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 33 days.

(21) Appl. No.: 18/140,725

(22) Filed: Apr. 28, 2023

(65) Prior Publication Data

US 2023/0370685 A1 Nov. 16, 2023

(30) Foreign Application Priority Data

May 10, 2022 (CN) .......................... 202210504837.4

(51) Int. Cl.
*H04N 21/4788* (2011.01)
*H04N 21/2187* (2011.01)
(Continued)

(52) U.S. Cl.
CPC ..... *H04N 21/4788* (2013.01); *H04N 21/2187* (2013.01); *H04N 21/235* (2013.01); *H04N 21/2543* (2013.01); *H04N 21/25866* (2013.01); *H04N 21/4312* (2013.01); *H04N 21/4316* (2013.01); *H04N 21/4318* (2013.01); *H04N 21/4882* (2013.01)

(58) Field of Classification Search
CPC .......... H04N 21/4788; H04N 21/2187; H04N 21/2543; H04N 21/4316; H04N 21/4318; H04N 21/4312; H04N 21/4882
See application file for complete search history.

(56) References Cited

U.S. PATENT DOCUMENTS 9,467,724 B2 * 10/2016 Patterson ........... H04N 21/4312
2018/0255346 A1 * 9/2018 Guo .................... H04N 21/4858
(Continued)

FOREIGN PATENT DOCUMENTS

| CN | 105828164 A | 8/2016 |
| CN | 108055552 A | 5/2018 |

(Continued)

*Primary Examiner* — Pinkal R Chokshi
(74) *Attorney, Agent, or Firm* — MCANDREWS HELD & MALLOY, LTD

(57) ABSTRACT

This application provides a bullet-screen comment display method. The bullet-screen comment display method applied to a client includes: obtaining a subscription type of a user for a target live room and a bullet-screen comment type of a to-be-displayed bullet-screen comment in the target live room; determining a target display parameter of the to-be-displayed bullet-screen comment based on the subscription type and the bullet-screen comment type, where the target display parameter includes a target display area and a target display direction, and different bullet-screen comment types correspond to different display areas and display directions; and rendering the to-be-displayed bullet-screen comment in the target display area in the target live room based on the target display direction.

18 Claims, 10 Drawing Sheets

(51) Int. Cl.
*H04N 21/235* (2011.01)
*H04N 21/2543* (2011.01)
*H04N 21/258* (2011.01)
*H04N 21/431* (2011.01)
*H04N 21/488* (2011.01)

(56) References Cited

U.S. PATENT DOCUMENTS

| | | | |
|---|---|---|---|
| 2019/0166394 A1* | 5/2019 | Lin | H04N 21/47217 |
| 2019/0200086 A1* | 6/2019 | E | H04N 21/4532 |
| 2020/0099988 A1* | 3/2020 | Liu | H04N 21/25883 |
| 2020/0374590 A1* | 11/2020 | Lu | H04N 21/4788 |
| 2022/0201364 A1* | 6/2022 | Kong | H04N 21/4884 |
| 2022/0417619 A1* | 12/2022 | Lu | H04L 43/106 |
| 2023/0011255 A1* | 1/2023 | Tang | H04N 21/2668 |
| 2023/0326115 A1* | 10/2023 | Xiao | H04N 21/431 |
| | | | 345/473 |
| 2023/0356082 A1* | 11/2023 | Tang | A63F 13/537 |
| 2023/0370686 A1* | 11/2023 | Cai | H04N 21/4788 |

FOREIGN PATENT DOCUMENTS

| | | |
|---|---|---|
| CN | 108683956 A | 10/2018 |
| CN | 111031399 A | 4/2020 |
| CN | 1123280911 A | 2/2021 |
| CN | 11322557 A | 8/2021 |
| CN | 113301357 A | 8/2021 |
| CN | 113473208 A | 10/2021 |

* cited by examiner

BULLET-SCREEN COMMENT DISPLAY

CROSS-REFERENCE TO RELATED APPLICATION

The present application claims priority to Chinese Patent Application No. 202210504837.4, filed with the China National Intellectual Property Administration on May 10, 2022, which is incorporated herein by reference in its entirety.

TECHNICAL FIELD

This application relates to the field of computer technologies, and in particular, to a bullet-screen comment display method. This application also relates to a computing device.

BACKGROUND

With rapid development of computer technologies, an increasingly large quantity of users view videos through live streaming. In addition, in a process of viewing a live video, the user can express feelings for the live video by sending a bullet-screen comment, and can further interact with another user by using the bullet-screen comment.

SUMMARY

According to a first aspect of the embodiments of this application, a bullet-screen comment display method is provided, is applied to a client, and includes:
 obtaining a subscription type of a user for a target live room and a bullet-screen comment type of a to-be-displayed bullet-screen comment in the target live room;
 determining a target display parameter of the to-be-displayed bullet-screen comment based on the subscription type and the bullet-screen comment type, where the target display parameter includes a target display area and a target display direction, and different bullet-screen comment types correspond to different display areas and display directions; and
 rendering the to-be-displayed bullet-screen comment in the target display area in the target live room based on the target display direction.

According to a second aspect of the embodiments of this application, a bullet-screen comment display method is provided, is applied to a server, and includes:
 receiving a to-be-displayed bullet-screen comment in a current live room, and determining a live room type of the current live room;
 determining a bullet-screen comment type of the to-be-displayed bullet-screen comment if it is determined, based on the live room type, that the current live room is a target live room, where the target live room is a live room with a subscription type; and
 sending a target client the to-be-displayed bullet-screen comment that carries the bullet-screen comment type, where the target client is a client that displays the target live room.

According to a third aspect of the embodiments of this application, a computing device is provided, and includes one or more processors; and
 a memory, storing one or more programs configured to be executed by the one or more processors, the one or more programs comprising instructions for:
  obtaining a subscription type of a user for a target live room and a bullet-screen comment type of a to-be-displayed bullet-screen comment in the target live room:
  determining a target display parameter of the to-be-displayed bullet-screen comment based on the subscription type and the bullet-screen comment type, wherein the target display parameter comprises a target display area and a target display direction, and different bullet-screen comment types correspond to different display areas and display directions; and
  rendering the to-be-displayed bullet-screen comment in the target display area in the target live room based on the target display direction.

DESCRIPTION OF EMBODIMENTS

Figure 1:
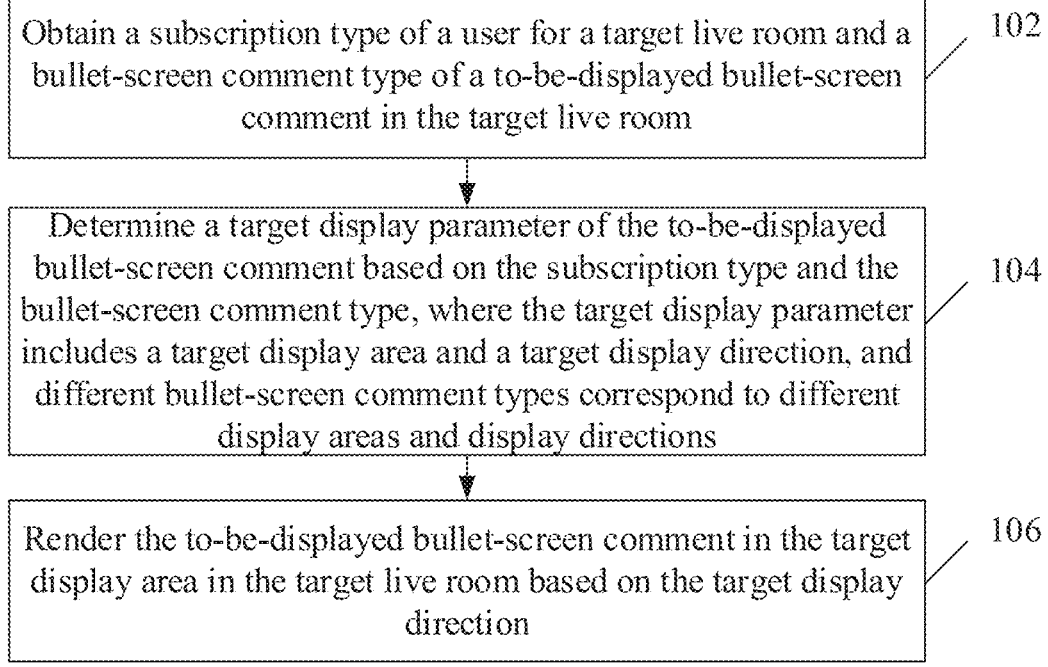
FIG. 1 is a flowchart of a bullet-screen comment display method according to some embodiments of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" may be used in one or more embodiments of this application to describe various types of information, the information is not limited to these terms. These terms are only used to distinguish between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

Nouns related to one or more embodiments of this application are first explained.

Subscription type: In this solution, different users have different subscription types for a target live room, and view different live videos at a same time. In other words, a live video viewed by the user in the live room corresponds to the subscription type of the user for the live room.

Bullet-screen comment type: It corresponds to a subscription type. Different subscription types correspond to different bullet-screen comment types.

Bullet-screen comment track: It is a track used to display a bullet-screen comment in a live interface.

Host bullet-screen comment: It is a bullet-screen comment sent by a user who logs in to a current client.

Content delivery network (CDN): It is a content delivery network constructed on a network. A basic principle of the CDN is as follows: Various cache servers are widely used, and these cache servers are distributed to areas or networks in which access of a user is relatively concentrated. When the user accesses a website, a global load technology is used to direct the user to access a nearest cache server that works normally, and the cache server directly responds to a user request, to increase a speed of response to access of the user and a hit rate. Key technologies of the CDN mainly include a content storage technology, a content delivery technology, and a load balancing technology.

Video transcoding means converting a compressed and encoded video bit rate stream into another video bit rate stream to adapt to different network bandwidths, different terminal processing capabilities, and different user requirements.

Bit rate: It refers to a quantity of data bits transmitted per unit time during data transmission. The bit rate indicates a quantity of bits required to represent compressed and encoded video and audio data per second, namely, a data amount obtained after an image displayed per second is compressed, and is usually in a unit of kbps, namely, thousands of bits per second. The bit rate is generally understood as a sampling rate. A higher sampling rate per unit time indicates higher precision and a higher similarity of a processed file to an original file, that is, indicates richer details of a picture.

The inventor of the present application finds that in an existing live room, a same live stream is played for all users who view live streaming, and unless a user uses a special effect for bullet-screen comment display, bullet-screen comments sent by all the users are displayed in a same manner in the live room, and all the users view a same bullet-screen comment. However, the foregoing bullet-screen comment display manner is relatively single, and bullet-screen comments with different viewpoints are mixed together, and may even overlap or cross. Consequently, there is relatively disordered bullet-screen comment display.

According to the bullet-screen comment display method provided in this application, the subscription type of the user for the target live room and the bullet-screen comment type of the to-be-displayed bullet-screen comment in the target live room are obtained; the target display parameter of the to-be-displayed bullet-screen comment is determined based on the subscription type and the bullet-screen comment type, where the target display parameter includes the target display area and the target display direction, and different bullet-screen comment types correspond to different display areas and display directions: and the to-be-displayed bullet-screen comment is rendered in the target display area in the target live room based on the target display direction. In the foregoing manner, for bullet-screen comments of different bullet-screen comment types, based on the subscription type of the user for the target live room, a bullet-screen comment from a camp that is the same as that of the user and a bullet-screen comment from a camp that is different from that of the user are displayed in different display areas based on different display directions. Therefore, bullet-screen comment display manners are enriched, to-be-displayed bullet-screen comments of different bullet-screen comment types can be clearly distinguished based on different display directions, a problem that the bullet-screen comments of different bullet-screen comment types overlap, cross, and are displayed in a disordered manner can be avoided by using different display areas, and the user who logs in to the client can clearly view bullet-screen comments sent by users in different camps, to enhance fun during live streaming, so as to improve user experience.

An application scenario of a bullet-screen comment display method provided in some embodiments of this application is described below.

In a live room of an ordinary type, only same video content can be played for all users, and bullet-screen comments are displayed by using a same effect. There is no application scenario in which different live streams are played at a same time in a same live room based on a subscription type selected by a user, and there is no solution in which same bullet-screen comment content is displayed in different manners based on different subscription types selected by the user. It may be learned that an existing bullet-screen comment display manner in a live room is relatively single. Consequently, there is a lack of fun during live streaming.

Therefore, this application provides a bullet-screen comment display method. The method is applied to a live room with a subscription type. Based on different subscription types of a user for the live room, a client in to which the user logs may play different live streams, and based on different subscription types of the user, bullet-screen comments sent by the user are displayed in different manners in the live room. In addition, it can be ensured that bullet-screen comments sent by users in different camps do not overlap and cross in both directions. Therefore, bullet-screen comment display manners are enriched, to enhance fun during live streaming, so as to improve user experience.

This application provides a bullet-screen comment display method. This application also relates to a bullet-screen comment display apparatus, a computing device, and a computer-readable storage medium. The bullet-screen comment display method, the bullet-screen comment display apparatus, the computing device, and the computer-readable storage medium are described in detail one by one in the following embodiments.

FIG. 1 is a flowchart of a bullet-screen comment display method according to some embodiments of this application. The method specifically includes the following steps.

Step 102: Obtain a subscription type of a user for a target live room and a bullet-screen comment type of a to-be-displayed bullet-screen comment in the target live room.

The target live room is a live room with a subscription type. A difference between the target live room and an ordinary live room is that in the ordinary live room, a same live video is played for all users at a same time point, but in the target live room, different live videos are played for users with different subscription types at a same time point. In other words, the target live room may be understood as a concept of a parallel world.

The subscription type may be understood as a type set for a live video to be played in the target live room. For example, the target live room may correspond to a plurality of live streams, and each live stream corresponds to one subscription type. If the user wants to select a live stream for viewing, the subscription type may be selected, and the corresponding live stream may be viewed based on the subscription type.

In some embodiments, the subscription type of the user for the target live room may be selected by the user when a client enters the target live room, and if the client detects an operation of selecting the subscription type by the user, the client can determine the subscription type of the user for the target live room. Alternatively, the subscription type of the user for the target live room may be set by default after the user enters the target live room by using a client. In this case, if the user does not perform an operation of selecting the subscription type, the client may determine a default subscription type as the subscription type of the user for the target live room.

In other words, the client determines the subscription type selected by the user when viewing live streaming or the default subscription type existing after the live room is entered as the subscription type of the user for the target live room.

In some embodiments, all users who view live streaming in the target live room may edit bullet-screen comments by using clients used to view live streaming by the users, the client sends the to-be-displayed bullet-screen comment edited by the user to a server, the server determines a bullet-screen comment type of the to-be-displayed bullet-screen comment, and then sends, to the client, the to-be-displayed bullet-screen comment that carries the bullet-screen comment type for rendering, and the client receives the to-be-displayed bullet-screen comment that carries the bullet-screen comment type. In other words, the client may obtain the bullet-screen comment type of the to-be-displayed bullet-screen comment.

It should be noted that for specific implementation in which the server determines the bullet-screen comment type of the to-be-displayed bullet-screen comment, refer to the following related description of the bullet-screen comment display method applied to the server.

In some embodiments of this application, a display status of the bullet-screen comment is related to both a type of the live room and the bullet-screen comment type of the bullet-screen comment. Therefore, the subscription type of the user for the target live room and the bullet-screen comment type of the to-be-displayed bullet-screen comment in the target live room may be first obtained, so that display of the to-be-displayed bullet-screen comment is subsequently determined.

Step 104: Determine a target display parameter of the to-be-displayed bullet-screen comment based on the subscription type and the bullet-screen comment type, where the target display parameter includes a target display area and a target display direction, and different bullet-screen comment types correspond to different display areas and display directions.

In some embodiments of this application, different bullet-screen comment types correspond to different display areas and display directions. Therefore, to-be-displayed bullet-screen comments of different bullet-screen comment types can be distinguished for display, to avoid a problem that the bullet-screen comments are displayed in a disordered manner because the bullet-screen comments of different types cross and overlap.

In a possible implementation of this application, specific implementation of this step may include: dividing a display interface of the target live room into a first display area and a second display area, and if the subscription type is the same as the bullet-screen comment type, determining the first display area and a display direction corresponding to the first display area as the target display parameter; or if the subscription type is different from the bullet-screen comment type, determining the second display area and a display direction corresponding to the second display area as the target display parameter.

The first display area is used to display a bullet-screen comment sent by a user that has a subscription type the same as that of the user who logs in to the client for the target live room. The second display area is used to display a bullet-screen comment sent by a user that has a subscription type different from that of the user who logs in to the client for the target live room. The first display area and the second display area do not overlap, and the display direction corresponding to the first display area is different from the display direction corresponding to the second display area. For example, the display direction corresponding to the first display area is opposite to the display direction corresponding to the second display area.

That is, if the subscription type is the same as the bullet-screen comment type, it indicates that a user who sends the to-be-displayed bullet-screen comment and the user who currently logs in to the client are in a same camp, and the to-be-displayed bullet-screen comment may be displayed in the first display area based on the display direction corresponding to the first display area, so that the user who currently logs in to the client can view an opinion expressed by the user in the same camp as the user. If the subscription type is different from the bullet-screen comment type, it indicates that a user who sends the to-be-displayed bullet-screen comment and the user who currently logs in to the client are in different camps, and the to-be-displayed bullet-screen comment may be displayed in the second display area based on the display direction corresponding to the second display area, to avoid a case in which bullet-screen comments sent by users in different camps cross and overlap.

For example, it is assumed that the first display area is an upper part that is 60% of a live interface, the second display area is a lower part that is 40% of the live interface, the display direction corresponding to the first display area is from right to left, and the display direction corresponding to the second display area is from left to right. In this case, if the subscription type is the same as the bullet-screen comment type, the to-be-displayed bullet-screen comment is displayed in the first display area in the display direction from right to left; or if the subscription type is different from the bullet-screen comment type, the to-be-displayed bullet-screen comment is displayed in the second display area in the display direction from left to right.

In the foregoing method, bullet-screen comments of different bullet-screen comment types are displayed in different display areas by using different display directions. Therefore, bullet-screen comment display manners are enriched, bullet-screen comments of different bullet-screen comment types can be clearly distinguished, and a problem that the bullet-screen comments are displayed in a disordered manner because the bullet-screen comments of different bullet-screen comment types overlap and cross can be avoided.

In another possible implementation of this application, the determining a target display parameter of the to-be-displayed bullet-screen comment based on the subscription type and the bullet-screen comment type may include:

determining a display direction of the to-be-displayed bullet-screen comment based on the subscription type and the bullet-screen comment type;

obtaining a bullet-screen comment track array, where the bullet-screen comment track array includes a plurality of bullet-screen comment tracks in a bullet-screen comment display area in the target live room and a display direction corresponding to each bullet-screen comment track;

determining a target bullet-screen comment track from the bullet-screen comment track array based on the display direction of the to-be-displayed bullet-screen comment and the display direction corresponding to each bullet-screen comment track; and determining the target display area based on the target bullet-screen comment track, and determining a display direction corresponding to the target bullet-screen comment track as the target display direction.

The bullet-screen comment track is a track used to display a bullet-screen comment in a live interface. The bullet-screen comment track is set to facilitate standardized display of the bullet-screen comment, to avoid a case in which viewing of the user is affected because the bullet-screen comment is displayed in crossed lines, overlaps, is at uneven levels, or the like.

In actual application, the display direction of the to-be-displayed bullet-screen comment may be first determined based on the subscription type and the bullet-screen comment type. Actually, the target display area of the to-be-displayed bullet-screen comment can be determined based on the direction of the bullet-screen comment track. However, the bullet-screen comment is displayed based on the bullet-screen comment track in the display area. Therefore, the bullet-screen comment track array needs to be obtained. Then, the bullet-screen comment track array is traversed from the beginning, the target bullet-screen comment track that can be used to display the to-be-displayed bullet-screen comment is determined based on the display direction of the to-be-displayed bullet-screen comment and the display direction corresponding to each bullet-screen comment track in the bullet-screen comment track array, and then the target display area is determined based on the target bullet-screen comment track, and the display direction corresponding to the target bullet-screen comment track is determined as the target display direction.

In one or more embodiments of this application, when the subscription type is the same as the bullet-screen comment type, it is determined that the display direction of the to-be-displayed bullet-screen comment is a first direction; or when the subscription type is different from the bullet-screen comment type, it is determined that the display direction of the to-be-displayed bullet-screen comment is a second direction. The first direction is opposite to the second direction.

In the foregoing manner, provided that it is ensured that the to-be-displayed bullet-screen comment is in different display directions in the two cases, to-be-displayed bullet-screen comments of different bullet-screen comment types can be distinguished.

In some embodiments, specific implementation of determining the display direction of the to-be-displayed bullet-screen comment based on the subscription type and the bullet-screen comment type may include;

if the subscription type is the same as the bullet-screen comment type, determining that the display direction of the to-be-displayed bullet-screen comment is a forward direction; or if the subscription type is different from the bullet-screen comment type, determining that the display direction of the to-be-displayed bullet-screen comment is a reverse direction.

That is, if the subscription type is the same as the bullet-screen comment type, it indicates that a user who sends the to-be-displayed bullet-screen comment and the user who currently logs in to the client are in a same camp. The user who currently logs in to the client is relatively glad to view the bullet-screen comment sent by the user in the same camp. Therefore, the to-be-displayed bullet-screen comment is displayed in the forward direction, in other words, it is determined that the display direction of the to-be-displayed bullet-screen comment is the forward direction. If the subscription type is different from the bullet-screen comment type, it indicates that a user who sends the to-be-displayed bullet-screen comment and the user who currently logs in to the client are in different camps. The user who currently logs in to the client may not want to view the bullet-screen comment sent by the user in a different camp. Therefore, the to-be-displayed bullet-screen comment is displayed in the reverse direction, in other words, it is determined that the display direction of the to-be-displayed bullet-screen comment is the reverse direction.

For example, it is assumed that the forward direction is usually a direction in which the bullet-screen comment is normally displayed. In this case, the forward direction may be a direction from right to left, and the reverse direction may be a direction from left to right. If the subscription type is A and the bullet-screen comment type is B, it is determined that the subscription type is different from the bullet-screen comment type, that is, a camp A is selected by the user who currently logs in to the client, and a camp B is selected by the user who sends the to-be-displayed bullet-screen comment. Therefore, it may be determined that the display direction of the to-be-displayed bullet-screen comment is the reverse direction, that is, the to-be-displayed bullet-screen comment is to be displayed from left to right.

In some embodiments of this application, in a subsequent process of determining the bullet-screen comment track, it needs to be determined, based on the display direction, whether the to-be-displayed bullet-screen comment is to be displayed in the bullet-screen comment track. Therefore, the display direction corresponding to the to-be-displayed bullet-screen comment needs to be determined, and it needs to be determined that the display direction of the bullet-screen comment sent by the user in the same camp as the user who logs in to the client is the forward direction, and the display direction of the bullet-screen comment sent by the user in a different camp is the reverse direction. In this case, bullet-screen comments from different camps can be preliminarily distinguished, to prepare for subsequent determining.

In one or more embodiments of this application, after the display direction of the to-be-displayed bullet-screen comment is determined, the display direction of the to-be-displayed bullet-screen comment needs to be compared with the display direction corresponding to the bullet-screen comment track. Therefore, the bullet-screen comment track array may be obtained, where the bullet-screen comment track array includes the plurality of bullet-screen comment tracks in the bullet-screen comment display area in the target live room and the display direction corresponding to each bullet-screen comment track, the display direction of the to-be-displayed bullet-screen comment may be compared with display directions corresponding to the plurality of bullet-screen comment tracks in the bullet-screen comment track array, to determine the target bullet-screen comment track based on a comparison result, and then the target display area and the target display direction may be determined.

In an example, when there is one to-be-displayed bullet-screen comment, if display directions corresponding to a plurality of bullet-screen comment tracks is the same as the display direction of the to-be-displayed bullet-screen comment, one of the plurality of bullet-screen comment tracks may be randomly selected as the target bullet-screen comment track, and then the target bullet-screen comment track may be determined as the target display area, and the display direction corresponding to the target bullet-screen comment track may be determined as the target display direction.

In another example, when there are a plurality of to-be-displayed bullet-screen comments, for one to-be-displayed bullet-screen comment, a target display area and a target display direction corresponding to the to-be-displayed bullet-screen comment may be determined in the foregoing manner. In addition, if the plurality of to-be-displayed bullet-screen comments include to-be-displayed bullet-screen comments that correspond to a same display direction, for the to-be-displayed bullet-screen comments that correspond to the same display direction, a same target display direction is determined, and different target display areas may be determined.

For example, it is assumed that there are two to-be-displayed bullet-screen comments a and b. In this case, if display directions of the two to-be-displayed bullet-screen comments are different, a target bullet-screen comment track determined for the to-be-displayed bullet-screen comment a is a track 1, a target bullet-screen comment track determined for the to-be-displayed bullet-screen comment b is a track 2, a display direction corresponding to the track 1 may be determined as the target display direction of the to-be-displayed bullet-screen comment a, and a display direction corresponding to the track 2 may be determined as the target display direction of the to-be-displayed bullet-screen comment b. If display directions of the two to-be-displayed bullet-screen comments are the same, a target bullet-screen comment track determined for the to-be-displayed bullet-screen comment a is a track 3, a target bullet-screen comment track determined for the to-be-displayed bullet-screen comment b is a track 4, and the track 3 and the track 4 correspond to a same display direction, and therefore the display direction corresponding to the track 3 or the track 4 may be determined as the target display direction of the to-be-displayed bullet-screen comments a and b.

In some embodiments of this application, the target display area and the target display direction of the to-be-displayed bullet-screen comment are determined in the foregoing manner based on the display direction of the to-be-displayed bullet-screen comment and the display direction corresponding to the bullet-screen comment track. Therefore, the to-be-displayed bullet-screen comment sent by the user in the same camp as the user who logs in to the client and the to-be-displayed bullet-screen comment sent by the user in a camp different from that of the user who logs in to the client can be displayed in different display areas based on different display directions, to display to-be-displayed bullet-screen comments of different bullet-screen comment types in a differentiated manner, and avoid a problem that the bullet-screen comments of different bullet-screen comment types overlap, cross, and are displayed in a disordered manner.

In one or more embodiments of this application, the obtained bullet-screen comment track array may be predetermined and stored in the client, and the bullet-screen comment track array may be directly obtained herein based on a live room identifier. Alternatively, the obtained bullet-screen comment track array may be predetermined and stored in the server, and obtained by the client from the server. That is, the bullet-screen comment track array is generated before the subscription type of the user for the target live room and the bullet-screen comment type of the to-be-displayed bullet-screen comment in the target live room are obtained, and specific implementation of generating the bullet-screen comment track array may include:

determining the bullet-screen comment display area in a live interface of the target live room;

dividing the bullet-screen comment display area into a first display area and a second display area based on a bullet-screen comment display rule, where the first display area and the second display area correspond to different display directions;

determining a bullet-screen comment track in each of the first display area and the second display area based on a preset bullet-screen comment track width; and determining the bullet-screen comment track and a display direction corresponding to each bullet-screen comment track as a bullet-screen comment track array, where the display direction corresponding to each bullet-screen comment track is the same as a display direction corresponding to a display area in which each bullet-screen comment track is located.

The bullet-screen comment display area is an area used to display a bullet-screen comment in the live interface of the target live room.

The preset bullet-screen comment track width is a size in a width direction occupied by a single bullet-screen comment track on a screen.

The bullet-screen comment display rule may be set by the user based on an actual situation, or may be set by the server or the client by default. This is not limited in the embodiments of this application. For example, the bullet-screen comment display rule may be to divide the bullet-screen comment display area into two display areas in a proportion of 3:2.

That is, the bullet-screen comment display area in which a bullet-screen comment can be displayed needs to be first determined in the live interface of the live room, then the bullet-screen comment display area is divided into the first display area and the second display area with different display directions based on the bullet-screen comment display rule, then the bullet-screen comment track in each display area is determined based on the preset bullet-screen comment track width, and finally each bullet-screen comment track and the display direction corresponding to the bullet-screen comment track is used as an array to form the bullet-screen comment track array.

In some embodiments, the bullet-screen comment display area may be a display area that can be independently adjusted by the user, or may be set by a device by default, and may be adjusted if the user is not satisfied. For example, the bullet-screen comment display area may be ¼, ½, or ¾ of or the entire live interface, or the bullet-screen comment display area may be 1%-100% of the live interface. This is not limited in the embodiments of this application.

In some embodiments, this solution is intended to distinguish between to-be-displayed bullet-screen comments of different bullet-screen comment types for display, and therefore the bullet-screen comment display area needs to be divided into the first display area and the second display area based on the bullet-screen comment display rule. The first display area may be used to display the bullet-screen comment sent by the user who belongs to the same camp as the user who currently logs in to the client, and the second display area may be used to display the bullet-screen comment sent by the user who belongs to a camp different from that of the user who currently logs in to the client. In addition, the first display area may be determined based on the bullet-screen comment display area, or may be determined based on the live interface.

For example, it is assumed that the bullet-screen comment display area occupies ½ of the live interface, and the bullet-screen comment display rule is to divide the bullet-screen comment display area in a proportion of 3:2. With reference to the bullet-screen comment display area, it may be determined that ⅗ of the bullet-screen comment display area is the first display area, and ⅖ of the bullet-screen comment display area is the second display area. With reference to the live interface, it may be determined that 3/10 of the live interface is the first display area, and 2/10 of the live interface is the second display area.

In some embodiments, after the first display area and the second display area are determined, the bullet-screen comment track in each of the first display area and the second display area may be determined based on the preset bullet-screen comment track width and a width of the live interface.

In an example, if the first display area and the second display area are determined based on the bullet-screen comment display area, a total quantity of tracks in the live interface may be first determined based on a height of the live interface and the preset bullet-screen comment track width, then a quantity of available tracks may be determined based on the total quantity of tracks and the bullet-screen comment display area, then a quantity of bullet-screen comment tracks in the first display area may be determined based on the quantity of available tracks and the first display area, and a quantity of bullet-screen comment tracks in the second display area may be determined based on the quantity of available tracks and the quantity of bullet-screen comment tracks in the first display area.

For example, the total quantity of tracks may be determined by using the following formula (1), and if the determined total quantity of tracks is not an integer, the total quantity of tracks may be rounded up, rounded down, or processed through rounding:

total quantity of tracks=height of the live interface/preset bullet-screen comment track width  (formula 1)

For example, if the height of the live interface is 360, and the preset bullet-screen comment track width is 12, it may be determined that the total quantity of tracks is 30; or if the preset bullet-screen comment track width is 11, it may be determined, through rounding down, that the total quantity of tracks is 32.

For example, the quantity of available tracks may be determined by using the following formula (2), and if the determined quantity of available tracks is not an integer, the quantity of available tracks may be rounded up, rounded down, or processed through rounding:

quantity of available tracks=total quantity of tracks*bullet-screen comment display area  (formula 2)

For example, if the total quantity of tracks is 32, and the bullet-screen comment display area is ½ of the live interface, it may be determined that the quantity of available tracks is 16; or if the bullet-screen comment display area is ⅓ of the live interface, it may be determined, through rounding, that the quantity of available tracks is 11.

It should be noted that if the determined quantity of available tracks is less than 2, it is determined that the quantity of available tracks is 2, that is, it needs to be ensured that at least one bullet-screen comment track is available in each display direction, so that bullet-screen comments of different bullet-screen comment types can be displayed in a differentiated manner.

For example, the quantity of bullet-screen comment tracks in the first display area may be determined by using the following formula (3), and if the determined quantity of bullet-screen comment tracks in the first display area is not an integer, the determined quantity of bullet-screen comment tracks in the first display area may be rounded up, rounded down, or processed through rounding:

quantity of bullet-screen comment tracks in the first display area=quantity of available tracks*first display area  (formula 3)

For example, if the quantity of available tracks is 16, and the first display area is ½ of the bullet-screen comment display area, it may be determined that the quantity of bullet-screen comment tracks in the first display area is 8; or if the first display area is ⅖ of the bullet-screen comment display area, it may be determined, through rounding up, that the quantity of bullet-screen comment tracks in the first display area is 4.

For example, a difference between the quantity of available tracks and the quantity of bullet-screen comment tracks in the first display area is then determined as the quantity of bullet-screen comment tracks in the second display area. When the first display area and the second display area are determined based on the bullet-screen comment display area, the bullet-screen comment track in each of the first display area and the second display area may be determined in the foregoing manner.

In another example, if the first display area and the second display area are determined based on the live interface, a total quantity of tracks in the live interface may be first determined based on a height of the live interface and the preset bullet-screen comment track width, then a quantity of bullet-screen comment tracks in the first display area may be determined based on the total quantity of tracks and the first display area, and a quantity of bullet-screen comment tracks in the second display area may be determined based on the total quantity of tracks and the second display area.

For example, the total quantity of tracks may be determined by using the foregoing formula (1), and if the determined total quantity of tracks is not an integer, the total quantity of tracks may be rounded up, rounded down, or processed through rounding.

For example, the quantity of bullet-screen comment tracks in the first display area may be determined by using the following formula (4), and if the determined quantity of bullet-screen comment tracks in the first display area is not an integer, the determined quantity of bullet-screen comment tracks in the first display area may be rounded up, rounded down, or processed through rounding:

$$\text{quantity of bullet-screen comment tracks in the display area} = \text{total quantity of tracks} * \text{display area} \quad \text{(formula 4)}$$

For example, if the total quantity of tracks is 30, and the first display area is $2/10$ of the live interface, it may be determined that the quantity of bullet-screen comment tracks in the first display area is 6; or if the first display area is $1/4$ of the live interface, it may be determined, through rounding, that the quantity of bullet-screen comment tracks in the first display area is 8.

Similarly, the quantity of bullet-screen comment tracks in the second display area may be determined by using the foregoing formula (4). When the first display area and the second display area are determined based on the live interface, the bullet-screen comment track in each of the first display area and the second display area may be determined in the foregoing manner.

It should be noted that when the bullet-screen comment track in each of the first display area and the second display area is determined in the foregoing two manners, if a quantity of bullet-screen comment tracks in a specific display area is less than 1, there is a value 1, that is, it needs to be ensured that there is a bullet-screen comment track in each display direction, to distinguish between to-be-displayed bullet-screen comments of different bullet-screen comment types.

In an example, after the bullet-screen comment track in each of the first display area and the second display area is determined, it may be determined that the display direction corresponding to the display area in which each bullet-screen comment track is located is the display direction corresponding to the bullet-screen comment track, a track identifier is set for each bullet-screen comment track, then the track identifier and the display direction corresponding to the bullet-screen comment track indicated by the track identifier are used as an array, to obtain a plurality of arrays in this manner, and the plurality of arrays are combined to obtain the bullet-screen comment track array. The track identifier of the bullet-screen comment track may be one or a combination of a letter, a number, a character, and the like. This is not limited in the embodiments of this application.

In some embodiments of this application, the bullet-screen comment display area in the live interface is first determined, then the bullet-screen comment display area is divided into two display areas with different display directions, then the bullet-screen comment track in each display area is determined, and then the track identifier of each bullet-screen comment track and the display direction corresponding to the bullet-screen comment track are used as an array, and arrays of the plurality of bullet-screen comment tracks form the bullet-screen comment track array. In this way, the bullet-screen comment track array can be generated in advance, so that the bullet-screen comment track array can be directly used when the to-be-displayed bullet-screen comment is displayed, to improve efficiency of determining the target display parameter of the to-be-displayed bullet-screen comment. In addition, in a process of generating the bullet-screen comment track array, it is ensured that there needs to be at least one bullet-screen comment track in each display area, so that bullet-screen comments of different bullet-screen comment types can be displayed in a differentiated manner, to avoid a problem that the bullet-screen comments of different bullet-screen comment types cross, overlap, and are displayed in a disordered manner.

In addition, after being generated, the bullet-screen comment track array may be stored in the client, and the bullet-screen comment track array and a live room identifier of the target live room may be correspondingly stored. Therefore, the client may obtain the bullet-screen comment track array based on the live room identifier of the target live room, to improve efficiency of determining the bullet-screen comment track array.

In one or more embodiments of this application, specific implementation of determining the target bullet-screen comment track from the bullet-screen comment track array based on the display direction of the to-be-displayed bullet-screen comment and the display direction corresponding to each bullet-screen comment track may include:

identifying whether a display direction corresponding to a current bullet-screen comment track is the same as the display direction of the to-be-displayed bullet-screen comment, where the current bullet-screen comment track is any bullet-screen comment track in the bullet-screen comment track array: and if the display direction corresponding to the current bullet-screen comment track is the same as the display direction of the to-be-displayed bullet-screen comment, determining the target bullet-screen comment track from the bullet-screen comment track array based on bullet-screen comment information in the current bullet-screen comment track; or if the display direction corresponding to the current bullet-screen comment track is different from the display direction of the to-be-displayed bullet-screen comment, determining the target bullet-screen comment track based on an identification result indicating whether the current bullet-screen comment track is a designated bullet-screen comment track.

The designated bullet-screen comment track may be the last bullet-screen comment track in the bullet-screen comment track array, that is, whether the current bullet-screen comment track is the designated bullet-screen comment track is related to an arrangement ranking of the current bullet-screen comment track in the bullet-screen comment track array.

In specific implementation, the plurality of bullet-screen comment tracks are arranged in the bullet-screen comment track array in a display order from top to bottom in the live interface, and the target bullet-screen comment track may be determined by traversing the bullet-screen comment tracks in the bullet-screen comment track array based on the order. First, it is determined whether the display direction corresponding to the current bullet-screen comment track is the same as the display direction of the to-be-displayed bullet-screen comment. If the display direction corresponding to the current bullet-screen comment track is the same as the display direction of the to-be-displayed bullet-screen comment, it indicates that the to-be-displayed bullet-screen comment may be displayed in the current bullet-screen comment track, but a status of another bullet-screen comment in the current bullet-screen comment track needs to be determined. Therefore, the target bullet-screen comment track may be determined based on the bullet-screen comment information in the current bullet-screen comment track. If the display direction corresponding to the current bullet-screen comment track is different from the display direction of the to-be-displayed bullet-screen comment, it indicates that the to-be-displayed bullet-screen comment cannot be displayed in the current bullet-screen comment track, and the target bullet-screen comment track may be determined based on the identification result indicating whether the current bullet-screen comment track is the designated bullet-screen comment track.

For example, if the display direction corresponding to the current bullet-screen comment track is the forward direction, and the display direction of the to-be-displayed bullet-screen comment is the reverse direction, it may be determined that the display direction corresponding to the current bullet-screen comment track is different from the display direction of the to-be-displayed bullet-screen comment, and it may be identified whether the current bullet-screen comment track is the designated bullet-screen comment track, and the target bullet-screen comment track may be determined based on the identification result; or if the display direction of the to-be-displayed bullet-screen comment is the forward direction, it may be determined that the display direction corresponding to the current bullet-screen comment track is the same as the display direction of the to-be-displayed bullet-screen comment, and the target bullet-screen comment track may be determined based on the bullet-screen comment information in the current bullet-screen comment track.

In some embodiments of this application, whether the current bullet-screen comment track is the designated bullet-screen comment track may be determined based on the arrangement ranking of the current bullet-screen comment track in the bullet-screen comment track array. For example, it is assumed that the bullet-screen comment track array includes 30 bullet-screen comment tracks, display directions corresponding to 20 bullet-screen comment tracks are the forward direction, and display directions corresponding to 10 bullet-screen comment tracks are the reverse direction. In this case, if the display direction corresponding to the current bullet-screen comment track is the forward direction, and the arrangement ranking of the current bullet-screen comment track in the bullet-screen comment track array is 20, it may be determined that the current bullet-screen comment track is not the last bullet-screen comment track in the bullet-screen comment track array, that is, the current bullet-screen comment track is not the designated bullet-screen comment track, and the identification result is no.

In some embodiments of this application, whether the current bullet-screen comment track can be used to display the to-be-displayed bullet-screen comment is first roughly determined based on whether the display direction corresponding to the current bullet-screen comment track is the same as the display direction of the to-be-displayed bullet-screen comment, and then the target bullet-screen comment track is determined in manners that best conform to cases in which the display direction corresponding to the current bullet-screen comment track is the same as the display direction of the to-be-displayed bullet-screen comment and the display direction corresponding to the current bullet-screen comment track is different from the display direction of the to-be-displayed bullet-screen comment, to improve efficiency and accuracy of determining the target bullet-screen comment track.

In one or more embodiments of this application, when it is identified whether the current bullet-screen comment track is the designated bullet-screen comment track, the identification result includes two cases, and therefore there may be two cases of determining the target bullet-screen comment track based on the identification result indicating whether the current bullet-screen comment track is the designated bullet-screen comment track.

Case 1: The current bullet-screen comment track is not the designated bullet-screen comment track.

In some embodiments, specific implementation of determining the target bullet-screen comment track based on the identification result indicating whether the current bullet-screen comment track is the designated bullet-screen comment track may include:

when the current bullet-screen comment track is not the designated bullet-screen comment track, identifying whether a display direction corresponding to a next bullet-screen comment track of the current bullet-screen comment track is the same as the display direction of the to-be-displayed bullet-screen comment.

For example, the designated bullet-screen comment track is the last bullet-screen comment track in the bullet-screen comment track array. In this case, if the display direction corresponding to the current bullet-screen comment track is different from the display direction of the to-be-displayed bullet-screen comment, the current bullet-screen comment track cannot be used to display the to-be-displayed bullet-screen comment, and the next bullet-screen comment track may be selected for judgment. However, if the current bullet-screen comment track is already the last bullet-screen comment track, no next bullet-screen comment track can be used for determining. Therefore, it may be first identified whether the current bullet-screen comment track is the last bullet-screen comment track in the bullet-screen comment track array.

In an example, if it is determined, based on the identification result, that the current bullet-screen comment track is not the last bullet-screen comment track, it indicates that the display direction corresponding to the current bullet-screen comment track and a display direction corresponding to a previously traversed bullet-screen comment track are different from the display direction of the to-be-displayed bullet-screen comment. Therefore, whether the display direction corresponding to the next bullet-screen comment track is the same as the display direction of the to-be-displayed bullet-screen comment may continue to be determined. If the display direction corresponding to the next bullet-screen comment track is the same as the display direction of the to-be-displayed bullet-screen comment, the target bullet-screen comment track is determined from the bullet-screen comment track array based on bullet-screen comment information in the next bullet-screen comment track. If the display direction corresponding to the next bullet-screen comment track is different from the display direction of the to-be-displayed bullet-screen comment, the target bullet-screen comment track is determined based on an identification result indicating whether the next bullet-screen comment track is the designated bullet-screen comment track.

For example, if the current bullet-screen comment track is a twentieth bullet-screen comment track in the bullet-screen comment track array, when the current bullet-screen comment track is not the last bullet-screen comment track, it may be identified whether a display direction corresponding to a twenty-first bullet-screen comment track is the same as the display direction of the to-be-displayed bullet-screen comment. If the display direction corresponding to the twenty-first bullet-screen comment track is the same as the display direction of the to-be-displayed bullet-screen comment, the target bullet-screen comment track is determined from the bullet-screen comment track array based on bullet-screen comment information in the twenty-first current bullet-screen comment track. If the display direction corresponding to the twenty-first bullet-screen comment track is different from the display direction of the to-be-displayed bullet-screen comment, the target bullet-screen comment track is determined based on an identification result indicating whether the twenty-first bullet-screen comment track is the designated bullet-screen comment track.

In some embodiments of this application, if the current bullet-screen comment track is not the last bullet-screen comment track, it may be identified whether the display direction corresponding to the next bullet-screen comment track is the same as the display direction of the to-be-displayed bullet-screen comment, that is, a step performed on the current bullet-screen comment track is performed. In this way, when the to-be-displayed bullet-screen comment cannot be displayed in the current bullet-screen comment track, it is first determined whether the current bullet-screen comment track is the last bullet-screen comment track. Therefore, a useless operation can be avoided, and a next bullet-screen comment track screening process is quickly entered, to improve efficiency of determining the target bullet-screen comment track.

Case 2: The current bullet-screen comment track is the designated bullet-screen comment track.

In a possible implementation of this application, specific implementation of determining the target bullet-screen comment track based on the identification result indicating whether the current bullet-screen comment track is the designated bullet-screen comment track may include: deleting the to-be-displayed bullet-screen comment when the current bullet-screen comment track is the designated bullet-screen comment track.

For example, the designated bullet-screen comment track is the last bullet-screen comment track. In this case, if it is determined, based on the identification result, that the current bullet-screen comment track is the last bullet-screen comment track, it indicates that the to-be-displayed bullet-screen comment possibly cannot be displayed in all the bullet-screen comment tracks in the bullet-screen comment track array. Therefore, the to-be-displayed bullet-screen comment may be deleted, in other words, the to-be-displayed bullet-screen comment is not displayed. In this way, a processing resource for bullet-screen comment rendering can be saved, and a problem that a processing burden of the client is heavy due to an excessively large quantity of bullet-screen comments can be avoided.

In another possible implementation of this application, specific implementation of determining the target bullet-screen comment track based on the identification result indicating whether the current bullet-screen comment track is the designated bullet-screen comment track may include:

when the current bullet-screen comment track is the designated bullet-screen comment track, if the to-be-displayed bullet-screen comment is a host bullet-screen comment, selecting a bullet-screen comment track whose display direction is the forward direction from the bullet-screen comment track array as the target bullet-screen comment track.

The host bullet-screen comment is a bullet-screen comment sent by the user who logs in to the client, and the client is a client that currently renders the to-be-displayed bullet-screen comment.

In some embodiments, if it is determined, based on the identification result, that the current bullet-screen comment track is the last bullet-screen comment track, other bullet-screen comment tracks in the bullet-screen comment track array are inevitably traversed, and none of the other bullet-screen comment tracks can be used to display the to-be-displayed bullet-screen comment. However, if the to-be-displayed bullet-screen comment is a bullet-screen comment sent by the user who currently logs in to the client, bad experience is brought to the user if the to-be-displayed bullet-screen comment is deleted. Therefore, it may be determined whether the to-be-displayed bullet-screen comment is a host bullet-screen comment.

In an example, the to-be-displayed bullet-screen comment may carry a user identifier, and it may be identified whether the user identifier is the same as a user identifier of the user who currently logs in to the client. If the user identifier is the same as the user identifier of the user who currently logs in to the client, it is determined that the to-be-displayed bullet-screen comment is a host bullet-screen comment. A user who sends the host bullet-screen comment is the user who currently logs in to the client, and therefore the display direction of the to-be-displayed bullet-screen comment is inevitably the forward direction. Therefore, the bullet-screen comment track whose display direction is the forward direction may be selected from the bullet-screen comment track array as the target bullet-screen comment track.

For example, a bullet-screen comment track whose display direction is the forward direction may be randomly selected from the bullet-screen comment track array as the target bullet-screen comment track, or a first bullet-screen comment track, in the bullet-screen comment track array, whose display direction is the forward direction may be selected as the target bullet-screen comment track. This is not limited in the embodiments of this application.

In some embodiments of this application, if the current bullet-screen comment track is the last bullet-screen comment track, to avoid a case in which the bullet-screen comment sent by the user is deleted, it may be determined whether the to-be-displayed bullet-screen comment is a host bullet-screen comment, and when the to-be-displayed bullet-screen comment is a host bullet-screen comment, the bullet-screen comment track whose display direction is the forward direction is selected as the target bullet-screen comment track. In this way, a case in which the to-be-displayed bullet-screen comment sent by the user who logs in to the client is deleted can be avoided, and if the to-be-displayed bullet-screen comment is displayed in the first bullet-screen comment track in the live interface, the user can clearly and quickly view the bullet-screen comment sent by the user, to improve user experience.

In still another possible implementation of this application, when the current bullet-screen comment track is the designated bullet-screen comment track, if the to-be-displayed bullet-screen comment is a host bullet-screen comment, a cache queue may be set for the host bullet-screen comment, and the host bullet-screen comment may be stored in the cache queue. When there is an available bullet-screen comment track that corresponds to a display direction that is consistent with the display direction of the to-be-displayed bullet-screen comment in the bullet-screen comment track array, the available bullet-screen comment track may be determined as the target bullet-screen comment track of the host bullet-screen comment, that is, the host bullet-screen comment may be rendered, so that the user can view the bullet-screen comment sent by the user, to bring better user experience.

It should be noted that in the embodiments of this application, whether the to-be-displayed bullet-screen comment is a host bullet-screen comment is determined after the foregoing series of determining operations are performed. In some other embodiments of this application, after the display direction of the to-be-displayed bullet-screen comment is determined, it may be first determined whether the to-be-displayed bullet-screen comment is a host bullet-screen comment. If the to-be-displayed bullet-screen comment is a host bullet-screen comment, and there is an available bullet-screen comment track in the bullet-screen comment track array, a bullet-screen comment track whose display direction is the forward direction may be selected from the bullet-screen comment track array as the target bullet-screen comment track. If the to-be-displayed bullet-screen comment is a host bullet-screen comment, and there is no available bullet-screen comment track in the bullet-screen comment track array, the host bullet-screen comment may be stored in a cache queue, and when there is an available bullet-screen comment track, the host bullet-screen comment may be rendered. If the to-be-displayed bullet-screen comment is not a host bullet-screen comment, the step of identifying whether a display direction corresponding to a current bullet-screen comment track is the same as the display direction of the to-be-displayed bullet-screen comment is performed.

In other words, identifying whether the to-be-displayed bullet-screen comment is a host bullet-screen comment may be a first operation performed when the target bullet-screen comment track is determined, or may be an operation performed in a process of performing the foregoing determining operations. This is not limited in the embodiments of this application.

In some embodiments of this application, when the current bullet-screen comment track is the designated bullet-screen comment track, if the to-be-displayed bullet-screen comment is not a host bullet-screen comment, it indicates that the to-be-displayed bullet-screen comment is not sent by the user who logs in to the client, and when there is no other bullet-screen comment track in which the to-be-displayed bullet-screen comment can be displayed, the to-be-displayed bullet-screen comment can be deleted, to reduce a storage burden of the client and a bullet-screen comment rendering burden of the client.

It should be noted that operations performed when the display direction corresponding to the current bullet-screen comment track is different from the display direction of the to-be-displayed bullet-screen comment are described above. Operations performed when the display direction corresponding to the current bullet-screen comment track is the same as the display direction of the to-be-displayed bullet-screen comment are described below.

In one or more embodiments of this application, the bullet-screen comment information may include a quantity of bullet-screen comments; and specific implementation of determining the target bullet-screen comment track from the bullet-screen comment track array based on the bullet-screen comment information in the current bullet-screen comment track may include: identifying, based on the quantity of bullet-screen comments, whether there is a bullet-screen comment in the current bullet-screen comment track; and if there is no bullet-screen comment in the current bullet-screen comment track, determining the current bullet-screen comment track as the target bullet-screen comment track.

That is, when the display direction corresponding to the current bullet-screen comment track is the same as the display direction of the to-be-displayed bullet-screen comment, in other words, the to-be-displayed bullet-screen comment possibly can be displayed in the current bullet-screen comment track, it needs to be further determined whether there is a large enough position in the current bullet-screen comment track to display the to-be-displayed bullet-screen comment. Therefore, it may be identified, based on the quantity of bullet-screen comments, whether there is a bullet-screen comment in the current bullet-screen comment track. If there is no bullet-screen comment in the current bullet-screen comment track, the to-be-displayed bullet-screen comment can be inevitably displayed in the current bullet-screen comment track, and the current bullet-screen comment track is determined as the target bullet-screen comment track.

In an example, in a live streaming process, the server continuously receives the to-be-displayed bullet-screen comment sent by the user, determines the bullet-screen comment type of the to-be-displayed bullet-screen comment, and sends, to the client, the to-be-displayed bullet-screen comment that carries the bullet-screen comment type, and the client continuously receives the to-be-displayed bullet-screen comment that carries the bullet-screen comment type, and then determines the target bullet-screen comment track of the to-be-displayed bullet-screen comment in the manner provided in this application. Therefore, a quantity of to-be-displayed bullet-screen comments in each target bullet-screen comment track may be directly obtained, that is, the quantity of bullet-screen comments in the current bullet-screen comment track may be obtained based on a track identifier of the current bullet-screen comment track. If the quantity of bullet-screen comments is 0, it indicates that there is no bullet-screen comment in the bullet-screen comment track, and therefore the bullet-screen comment track may be determined as the target bullet-screen comment track for displaying the to-be-displayed bullet-screen comment.

In another example, if it is determined, based on the quantity of bullet-screen comments, that there is a bullet-screen comment in the current bullet-screen comment track, it may be considered that there is no position in the current bullet-screen comment track to display the to-be-displayed bullet-screen comment, and therefore the step of identifying whether a display direction corresponding to a next bullet-screen comment track of the current bullet-screen comment track is the same as the display direction of the to-be-displayed bullet-screen comment may be performed.

In some embodiments of this application, when the display direction corresponding to the current bullet-screen comment track is the same as the display direction of the to-be-displayed bullet-screen comment, the current bullet-screen comment track is not directly determined as the target bullet-screen comment track, but it is determined, based on the quantity of bullet-screen comments, whether there is a bullet-screen comment in the current bullet-screen comment track, and the current bullet-screen comment track is determined as the target bullet-screen comment track only when there is no bullet-screen comment, or when there is a bullet-screen comment in the current bullet-screen comment track, determining is performed for the next bullet-screen comment track, and the current bullet-screen comment track is not determined as the target bullet-screen comment track. In this way, a problem that there is no position in the determined target bullet-screen comment track to display the to-be-displayed bullet-screen comment or there is a delay in the bullet-screen comment due to a relatively large interval between a time at which the to-be-displayed bullet-screen comment can be displayed and a time of sending the bullet-screen comment can be avoided, to improve accuracy of determining the target bullet-screen comment track.

In one or more embodiments of this application, after it is identified, based on the quantity of bullet-screen comments, whether there is a bullet-screen comment in the current bullet-screen comment track, the method further includes:

if there is a bullet-screen comment in the current bullet-screen comment track, determining whether a quantity of bullet-screen comments that have been rendered in the current bullet-screen comment track reaches a preset threshold; and if the quantity of bullet-screen comments that have been rendered in the current bullet-screen comment track reaches the preset threshold, determining the target bullet-screen comment track based on the identification result indicating whether the current bullet-screen comment track is the designated bullet-screen comment track.

The preset threshold may be a percentage of a quantity of bullet-screen comments that can be displayed in the bullet-screen comment track, may be set by the user based on an actual requirement, or may be set by the device by default. This is not limited in the embodiments of this application. For example, the preset threshold may be 90%, 95%, or 100% of the quantity of bullet-screen comments that can be displayed in the bullet-screen comment track.

In an example, during rendering of a bullet-screen comment, a rendering status of each bullet-screen comment in the bullet-screen comment track may be recorded, and stored in a correspondence with a track identifier of the bullet-screen comment track. Therefore, herein, a rendering status of the bullet-screen comment in the current bullet-screen comment track may be determined based on the track identifier of the current bullet-screen comment track, and the quantity of bullet-screen comments that have been rendered is determined based on the rendering status of the bullet-screen comment.

In some embodiments, if there is a bullet-screen comment in the current bullet-screen comment track, and if there are a relatively large quantity of bullet-screen comments that have been rendered, there may be no position in the current bullet-screen comment track to display the to-be-displayed bullet-screen comment. Therefore, it needs to be determined whether the quantity of bullet-screen comments that have been rendered in the current bullet-screen comment track reaches the preset threshold. If the quantity of bullet-screen comments that have been rendered in the current bullet-screen comment track reaches the preset threshold, it indicates that there is no position in the current bullet-screen comment track to display the to-be-displayed bullet-screen comment. Therefore, the step of determining the target bullet-screen comment track based on an identification result indicating whether the current bullet-screen comment track is a designated bullet-screen comment track may be performed.

In some other embodiments, if there is a bullet-screen comment in the current bullet-screen comment track, it may be determined whether rendering of the last bullet-screen comment in the current bullet-screen comment track is completed. If rendering of the last bullet-screen comment is not completed, the to-be-displayed bullet-screen comment needs to wait to be rendered and displayed. To avoid a bullet-screen comment display delay, the current bullet-screen comment track is not determined as the target bullet-screen comment track, but the step of determining the target bullet-screen comment track based on an identification result indicating whether the current bullet-screen comment track is a designated bullet-screen comment track is performed.

In some embodiments of this application, when there is a bullet-screen comment in the current bullet-screen comment track, and the quantity of bullet-screen comments that have been rendered reaches the preset threshold, it may be considered that there is no position in the current bullet-screen comment track to display the to-be-displayed bullet-screen comment or it needs to wait for a relatively long time before the to-be-displayed bullet-screen comment can be displayed. Therefore, the step of determining the target bullet-screen comment track based on an identification result indicating whether the current bullet-screen comment track is a designated bullet-screen comment track may be performed. In this way, a case in which a poor viewing effect is caused to the user due to a delay in displaying the to-be-displayed bullet-screen comment can be avoided, and a case in which the user does not view the bullet-screen comment from the user because the to-be-displayed bullet-screen comment is deleted can be avoided, to improve viewing experience of the user.

In one or more embodiments of this application, after it is determined whether the quantity of bullet-screen comments that have been rendered in the current bullet-screen comment track reaches the preset threshold, the method further includes:

if the quantity of bullet-screen comments that have been rendered in the current bullet-screen comment track does not reach the preset threshold, determining whether a display time of the first character in the to-be-displayed bullet-screen comment is later than a display time of the last character in a target bullet-screen comment, where the target bullet-screen comment is the last bullet-screen comment that has been rendered in the current bullet-screen comment track; and if the display time of the first character in the to-be-displayed bullet-screen comment is later than the display time of the last character in the target bullet-screen comment, determining the current bullet-screen comment track as the target bullet-screen comment track.

That is, if the quantity of bullet-screen comments that have been rendered in the current bullet-screen comment track does not reach the preset threshold, it indicates that there may be a position in the current bullet-screen comment track that can be used to display the to-be-displayed bullet-screen comment. After the target bullet-screen comment track is determined for the to-be-displayed bullet-screen comment, the client renders the to-be-displayed bullet-screen comment. To avoid a case in which display of two bullet-screen comments overlaps, it needs to be determined whether the display time of the first character in the to-be-displayed bullet-screen comment is later than the display time of the last character in the last bullet-screen comment that has been rendered. If the display time of the first character in the to-be-displayed bullet-screen comment is later than the display time of the last character in the last bullet-screen comment that has been rendered, it indicates that there is no overlapping with the previous bullet-screen comment when the to-be-displayed bullet-screen comment currently starts to be rendered. Therefore, the current bullet-screen comment track may be determined as the target bullet-screen comment track.

In some embodiments, if the display time of the first character in the to-be-displayed bullet-screen comment is earlier than the display time of the last character in the target bullet-screen comment, the to-be-displayed bullet-screen comment should be displayed when the target bullet-screen comment is not completely displayed, and consequently there may be a case in which the to-be-displayed bullet-screen comment overlaps the target bullet-screen comment. Therefore, although the current bullet-screen comment track cannot be determined as the target bullet-screen comment track, the to-be-displayed bullet-screen comment does not need to be deleted, and the step of determining the target bullet-screen comment track based on an identification result indicating whether the current bullet-screen comment track is a designated bullet-screen comment track may be performed. In this way, a case in which bullet-screen comments are displayed in a disordered manner because the bullet-screen comments overlap can be avoided.

In some embodiments of this application, when the quantity of bullet-screen comments that have been rendered in the current bullet-screen comment track does not reach the preset threshold, if the display time of the first character in the to-be-displayed bullet-screen comment is later than the display time of the last character in the target bullet-screen comment, the to-be-displayed bullet-screen comment is displayed after the target bullet-screen comment is displayed, and the current bullet-screen comment track is determined as the target bullet-screen comment track. In this way, a case in which bullet-screen comments overlap can be avoided.

It should be noted that the target bullet-screen comment track can be determined for the to-be-displayed bullet-screen comment after the foregoing series of procedures are performed. However, in specific application, the bullet-screen comment display area may change, and in this case, the bullet-screen comment track also changes. On this basis, to continue to maintain a display proportion of display areas in different display directions in the bullet-screen comment display area, display directions of some bullet-screen comment tracks change. Although a display direction existing after the change is the same as the display direction of the to-be-displayed bullet-screen comment, the bullet-screen comment track may further include a bullet-screen comment that is not displayed and whose display direction is a display direction existing before the change, and if the to-be-displayed bullet-screen comment is displayed in the bullet-screen comment track, there may be a case in which the bullet-screen comments overlap and the bullet-screen comments are in different display directions in the same bullet-screen comment track.

Therefore, in one or more embodiments of this application, the bullet-screen comment information includes a display direction of the bullet-screen comment; and before it is determined whether the quantity of bullet-screen comments that have been rendered in the current bullet-screen comment track reaches the preset threshold, the method further includes:

determining whether a display direction of the target bullet-screen comment is the same as the display direction of the to-be-displayed bullet-screen comment, where the target bullet-screen comment is the last bullet-screen comment that has been rendered in the current bullet-screen comment track.

The determining whether a quantity of bullet-screen comments that have been rendered in the current bullet-screen comment track reaches a preset threshold includes:

if the display direction of the target bullet-screen comment is the same as the display direction of the to-be-displayed bullet-screen comment, determining whether the quantity of bullet-screen comments that have been rendered in the current bullet-screen comment track reaches the preset threshold.

In some embodiments, it may be first determined whether a display direction of the last bullet-screen comment in the current bullet-screen comment track is the same as the display direction of the to-be-displayed bullet-screen comment. If the display direction of the last bullet-screen comment in the current bullet-screen comment track is the same as the display direction of the to-be-displayed bullet-screen comment, it may be considered that the current bullet-screen comment track is not a bullet-screen comment track whose display direction changes, or the current bullet-screen comment track is a bullet-screen comment track whose display direction changes and all bullet-screen comments, in the current bullet-screen comment track, existing before the display direction changes are displayed. Therefore, it can be determined that the current bullet-screen comment track possibly can be used to display the to-be-displayed bullet-screen comment, and then the step of determining whether a quantity of bullet-screen comments that have been rendered in the current bullet-screen comment track reaches a preset threshold is performed.

In some other embodiments, if the display direction of the last bullet-screen comment in the current bullet-screen comment track is different from the display direction of the to-be-displayed bullet-screen comment, it may be considered that the current bullet-screen comment track is a bullet-screen comment track whose display direction changes, and all bullet-screen comments, in the current bullet-screen comment track, existing before the display direction changes are not completely displayed. Therefore, the to-be-displayed bullet-screen comment cannot be displayed in the current bullet-screen comment track, and the step of determining the target bullet-screen comment track based on an identification result indicating whether the current bullet-screen comment track is a designated bullet-screen comment track is performed.

In an example, if the display direction corresponding to the current bullet-screen comment track is the forward direction, after the user reduces the live interface, to ensure that the proportion of display areas in different display directions in the bullet-screen comment display area remains unchanged, the display direction corresponding to the current bullet-screen comment track is adjusted to the reverse direction. If the display direction of the to-be-displayed bullet-screen comment is also the reverse direction, it is determined that the display direction corresponding to the current bullet-screen comment track is the same as the display direction of the to-be-displayed bullet-screen comment. It is determined, by performing the foregoing determining operation, that there is a bullet-screen comment in the current bullet-screen comment track, and then it is determined whether the display direction of the last bullet-screen comment in the current bullet-screen comment track is the same as the display direction of the to-be-displayed bullet-screen comment. If the display direction of the last bullet-screen comment in the current bullet-screen comment track is the same as the display direction of the to-be-displayed bullet-screen comment, the current bullet-screen comment track is determined as the target bullet-screen comment track. If the display direction of the last bullet-screen comment in the current bullet-screen comment track is different from the display direction of the to-be-displayed bullet-screen comment, the step of determining the target bullet-screen comment track based on an identification result indicating whether the current bullet-screen comment track is a designated bullet-screen comment track is performed.

Figure 2:
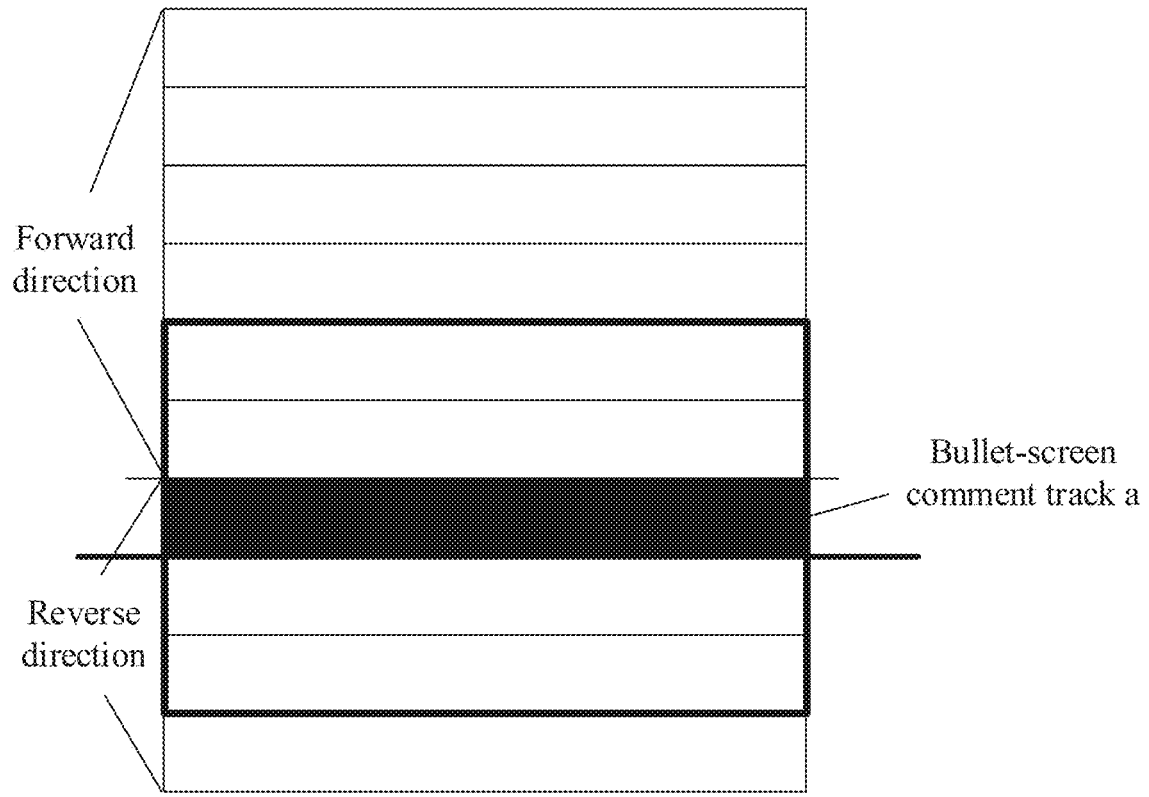
FIG. 2 is a schematic diagram of a bullet-screen comment track according to some embodiments of this application.

For example, FIG. 2 is a schematic diagram of a bullet-screen comment track according to some embodiments of this application. It is assumed that the bullet-screen comment display area in the target live room includes 10 bullet-screen comment tracks (a part surrounded by a thin line box in FIG. 2), six bullet-screen comment tracks correspond to the forward direction, and four bullet-screen comment tracks correspond to the reverse direction, in other words, a proportion of a quantity of forward bullet-screen comment tracks to a quantity of reverse bullet-screen comment tracks is 3:2. After the user reduces the live interface, the preset bullet-screen comment track width of a single bullet-screen comment track remains unchanged, and therefore a reduced live interface includes only five bullet-screen comment tracks (a part surrounded by a thick line box in FIG. 2). To ensure that the proportion of the quantity of forward bullet-screen comment tracks to the quantity of reverse bullet-screen comment tracks is still 3:2, there are three forward bullet-screen comment tracks and two reverse bullet-screen comment tracks in the five bullet-screen comment tracks, and a display direction corresponding to a bullet-screen comment track a changes from the reverse direction to the forward direction. Therefore, if the current bullet-screen comment track is the bullet-screen comment track a, and the display direction of the to-be-displayed bullet-screen comment is the forward direction, it may be determined that the display direction corresponding to the current bullet-screen comment track is the same as the display direction of the to-be-displayed bullet-screen comment. There is a bullet-screen comment in the bullet-screen comment track a, and the display direction of the last bullet-screen comment in the bullet-screen comment track a is the reverse direction, and therefore it may be determined that there is a bullet-screen comment whose bullet-screen comment type is different from that of the to-be-displayed bullet-screen comment and whose display is not completed in the bullet-screen comment track a. If the to-be-displayed bullet-screen comment is displayed in the bullet-screen comment track a, a problem that the to-be-displayed bullet-screen comment and the last bullet-screen comment overlap after being moved in opposite directions occurs, and consequently the bullet-screen comments are displayed in a disordered manner. Therefore, the to-be-displayed bullet-screen comment is not displayed in the bullet-screen comment track, and it is determined whether the to-be-displayed bullet-screen comment can be displayed in the next bullet-screen comment track.

In an example, when the preset bullet-screen comment track width remains unchanged, if a size of the live interface changes, there may be a bullet-screen comment track whose display direction changes, or display directions of all the bullet-screen comment tracks may not change. This is related to a size change manner of the live interface.

For example, it is assumed that there are originally 10 bullet-screen comment tracks, and there are six forward bullet-screen comment tracks and four reverse bullet-screen comment tracks. After reduction, there are five bullet-screen comment tracks, and the five bullet-screen comment tracks are last five of the 10 bullet-screen comment tracks. In this case, there is one forward bullet-screen comment track and four reverse bullet-screen comment tracks in the five bullet-screen comment tracks. In the five bullet-screen comment tracks, a current proportion of a quantity of bullet-screen comment tracks whose display direction is the forward direction to a quantity of bullet-screen comment tracks whose display direction is the reverse direction should be 3:2, and therefore display directions of two of the four reverse bullet-screen comment tracks change from the reverse direction to the forward direction. For another example, it is assumed that there are originally 10 bullet-screen comment tracks, and there are six forward bullet-screen comment tracks and four reverse bullet-screen comment tracks. After reduction, there are five bullet-screen comment tracks, and the five bullet-screen comment tracks are selected from the middle of the 20 bullet-screen comment tracks, and exactly include three forward bullet-screen comment tracks and two reverse bullet-screen comment tracks. In this case, in the five bullet-screen comment tracks, a current proportion of a quantity of bullet-screen comment tracks whose display direction is the forward direction to a quantity of bullet-screen comment tracks whose display direction is the reverse direction meets the requirement of 3:2, and therefore none of display directions of the five bullet-screen comment tracks changes.

It should be noted that description is provided above by using an example in which the quantity of bullet-screen comment tracks in the live interface is reduced. In another example, the size of the live interface may be increased, and the quantity of bullet-screen comment tracks may be increased. A new forward bullet-screen comment track and a new reverse bullet-screen comment track may be determined based on an increased quantity of bullet-screen comment tracks and a proportion of a quantity of forward bullet-screen comment tracks to a quantity of reverse bullet-screen comment tracks, and there may be some bullet-screen comment tracks whose display direction changes. Therefore, it also needs to be determined whether the display direction of the last bullet-screen comment in the current bullet-screen comment track is the same as the display direction of the to-be-displayed bullet-screen comment.

In some embodiments of this application, to avoid a case in which display of bullet-screen comments overlaps because the display direction corresponding to the current bullet-screen comment track changes, when the display direction of the last bullet-screen comment in the current bullet-screen comment track is the same as the display direction of the to-be-displayed bullet-screen comment, the current bullet-screen comment track may be determined as the target bullet-screen comment track, to avoid a case in which display of bullet-screen comments overlaps and avoid a case in which there are bullet-screen comments (namely, bullet-screen comments of different bullet-screen comment types) whose display directions are different in a same bullet-screen comment track, so as to improve viewing experience of the user.

It should be noted that the case in which the display direction corresponding to the bullet-screen comment track changes is described above by using an example in which the preset bullet-screen comment track width remains unchanged. In some other implementations, the preset bullet-screen comment track width may proportionally vary with the size of the live interface, and in this case, the display direction corresponding to the bullet-screen comment track may not change. Therefore, the step of determining whether a display direction of the last bullet-screen comment in the current bullet-screen comment track is the same as the display direction of the to-be-displayed bullet-screen comment may not be performed.

In some embodiments of this application, the display direction of the bullet-screen comment is first determined based on the subscription type and the bullet-screen comment type; then the bullet-screen comment track in the bullet-screen comment track array is traversed; and when the display direction corresponding to the current bullet-screen comment track is the same as the display direction of the to-be-displayed bullet-screen comment, it is determined, based on whether there is a bullet-screen comment in the current bullet-screen comment track, whether the quantity of bullet-screen comments that have been rendered in the current bullet-screen comment track reaches the preset threshold, and whether the display time of the first character in the to-be-displayed bullet-screen comment is later than the display time of the last character in the last bullet-screen comment in the current bullet-screen comment track, whether the current bullet-screen comment track can be determined as the target bullet-screen comment track; or when the display direction corresponding to the current bullet-screen comment track is different from the display direction of the to-be-displayed bullet-screen comment, and when the current bullet-screen comment track is not the last bullet-screen comment track, it is determined whether the next bullet-screen comment track can be used as the target bullet-screen comment track; or when the current bullet-screen comment track is the last bullet-screen comment track, the host bullet-screen comment sent by the user who logs in to the client is displayed in the bullet-screen comment track whose display direction is the forward direction. The display area and the display direction of the to-be-displayed bullet-screen comment can be determined by performing the foregoing determining operations one by one, so that bullet-screen comments of different bullet-screen comment types are displayed in different display directions in different display areas, to display the bullet-screen comments of different bullet-screen comment types in a differentiated manner, and avoid a problem that the bullet-screen comments overlap, cross, and are displayed in a disordered manner.

Step 106: Render the to-be-displayed bullet-screen comment in the target display area in the target live room based on the target display direction.

In this solution, after the target display direction and the target display area are determined, the to-be-displayed bullet-screen comment may be rendered and displayed in the target display area in the live interface of the target live room based on the target display direction.

In some embodiments, to further distinguish between to-be-displayed bullet-screen comments of different bullet-screen comment types, a distinction may be made on a rendering style of the bullet-screen comment. Therefore, before the to-be-displayed bullet-screen comment is rendered in the target display area in the target live room based on the target display direction, the method further includes:

determining a target rendering style of the to-be-displayed bullet-screen comment based on the bullet-screen comment type.

Correspondingly, the rendering the to-be-displayed bullet-screen comment in the target display area in the target live room based on the target display direction includes:

rendering the to-be-displayed bullet-screen comment in the target display area in the target live room based on the target display direction and the target rendering style.

The target rendering style is a rendering style used to render the to-be-displayed bullet-screen comment. For example, the target rendering style may include a color, a font, a size, and a special effect.

In an example, a correspondence between a bullet-screen comment type and a rendering style may be preset, and then the target rendering style of the to-be-displayed bullet-screen comment may be determined based on the bullet-screen comment type. For example, for the to-be-displayed bullet-screen comment with a bullet-screen comment type A, the target rendering style includes red and KaiTi, and for the to-be-displayed bullet-screen comment with a bullet-screen comment type B, the target rendering style includes blue and Song.

In an example, after the target rendering style is determined, the target display direction, the target display area, and the target rendering style may be sent to a target client. For example, the target rendering style "red and KaiTi", the target display direction "forward direction", and the target display area "target bullet-screen comment track 1" are sent to the target client, and the target client renders, in the target bullet-screen comment track 1 in red and KaiTi, the to-be-displayed bullet-screen comment that is displayed in the forward direction.

For example, the subscription type may also be referred to as a user camp or a live room camp, and the display area, the display direction, and the rendering style of the to-be-displayed bullet-screen comment may be referred to as display forms of the to-be-displayed bullet-screen comment. Table 1 is a table of correspondence between the live room camp and the display form of the to-be-displayed bullet-screen comment.

TABLE 1

Table of correspondence between the live room camp and the display form of the to-be-displayed bullet-screen comment

| Live room camp | To-be-displayed bullet-screen comment | Display area | Display direction | Rendering style (color) |
|---|---|---|---|---|
| Camp A | Bullet-screen comment from the camp A or host bullet-screen comment | Upper part that is 60% of the bullet-screen comment display area | Move from right to left | Blue |
| | Bullet-screen comment from the camp B | Lower part that is 40% of the bullet-screen comment display area | Move from left to right | Red |
| Camp B | Bullet-screen comment from the camp B or host bullet-screen comment | Upper part that is 60% of the bullet-screen comment display area | Move from right to left | Red |
| | Bullet-screen comment from the camp A | Lower part that is 40% of the bullet-screen comment display area | Move from left to right | Blue |

In the foregoing table, if a user who logs in to the target client is a user in the camp A, the live room is a live room of the camp A, and if the to-be-displayed bullet-screen comment is a bullet-screen comment from the camp A or a host bullet-screen comment, the to-be-displayed bullet-screen comment is displayed in the upper part that is 60% of the bullet-screen comment display area in the moving direction from right to left in the blue font, or if the to-be-displayed bullet-screen comment is a bullet-screen comment from the camp B, the to-be-displayed bullet-screen comment is displayed in the lower part that is 40% of the bullet-screen comment display area in the moving direction from left to right in the red font; or if a user that logs in to the client is a user in the camp B, the live room is a live room of the camp B, and if the to-be-displayed bullet-screen comment is a bullet-screen comment from the camp B or a host bullet-screen comment, the to-be-displayed bullet-screen comment is displayed in the upper part that is 60% of the bullet-screen comment display area in the moving direction from right to left in the red font, or if the to-be-displayed bullet-screen comment is a bullet-screen comment from the camp A, the to-be-displayed bullet-screen comment is displayed in the lower part that is 40% of the bullet-screen comment display area in the moving direction from left to right in the blue font.

Figure 3:
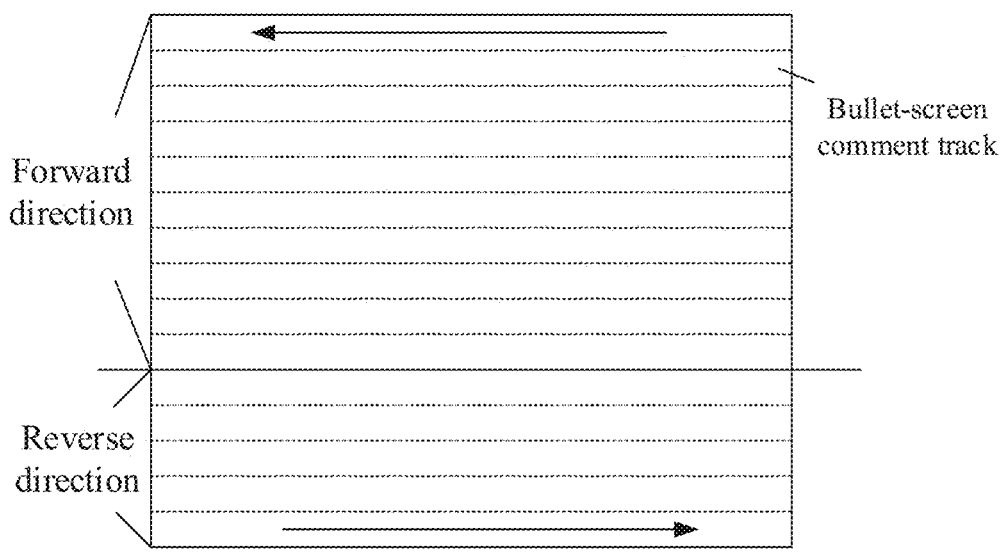
FIG. 3 is a schematic diagram of displaying a bullet-screen comment in a target live room according to some embodiments of this application.

For example, FIG. 3 is a schematic diagram of displaying a bullet-screen comment in a target live room according to some embodiments of this application. In FIG. 3, the bullet-screen comment display area in the live interface includes 15 bullet-screen comment tracks. Display directions corresponding to the first 10 bullet-screen comment tracks are the forward direction, and therefore a bullet-screen comment that moves in the forward direction (from right to left) is displayed in the first 10 bullet-screen comment tracks. Display directions corresponding to the last five bullet-screen comment tracks are the reverse direction, and therefore a bullet-screen comment that moves in the reverse direction (from left to right) is displayed in the last five bullet-screen comment tracks. For example, the target live room is a live room of the camp A or B. and the user selects the camp A or the camp B in advance. In this case, after the target live room is entered, the server pushes a live stream corresponding to the camp A or B to the user based on the camp type (subscription type) to which the user belongs, and the to-be-displayed bullet-screen comment is displayed in a corresponding display manner based on the camp selected by the user. For example, the user in the camp A views that a bullet-screen comment from the same camp as the user is displayed in the upper part of the live interface and moves in the forward direction (from right to left), and a bullet-screen comment from the camp B is displayed in the lower part of the live interface and moves in the reverse direction (from left to right), and the user in the camp B views that a bullet-screen comment from the same camp as the user is displayed in the upper part of the live interface and moves in the forward direction (from right to left), and a bullet-screen comment from the camp A is displayed in the lower part of the live interface and moves in the reverse direction (from left to right). Therefore, it can be ensured that bullet-screen comments from different camps are displayed in different display directions in different display areas, to ensure that the bullet-screen comments do not cross or overlap.

According to the bullet-screen comment display method provided in this application, the subscription type of the user for the target live room and the bullet-screen comment type of the to-be-displayed bullet-screen comment in the target live room are obtained; the target display parameter of the to-be-displayed bullet-screen comment is determined based on the subscription type and the bullet-screen comment type, where the target display parameter includes the target display area and the target display direction, and different bullet-screen comment types correspond to different display areas and display directions; and the to-be-displayed bullet-screen comment is rendered in the target display area in the target live room based on the target display direction. In the foregoing manner, for bullet-screen comments of different bullet-screen comment types, based on the subscription type of the user for the target live room, a bullet-screen comment from a camp that is the same as that of the user and a bullet-screen comment from a camp that is different from that of the user are displayed in different display areas based on different display directions. Therefore, bullet-screen comment display manners are enriched, to-be-displayed bullet-screen comments of different bullet-screen comment types can be clearly distinguished based on different display directions, a problem that the bullet-screen comments of different bullet-screen comment types overlap, cross, and are displayed in a disordered manner can be avoided by using different display areas, and the user who logs in to the client can clearly view bullet-screen comments sent by users in different camps, to enhance fun during live streaming, so as to improve user experience.

Figure 4:
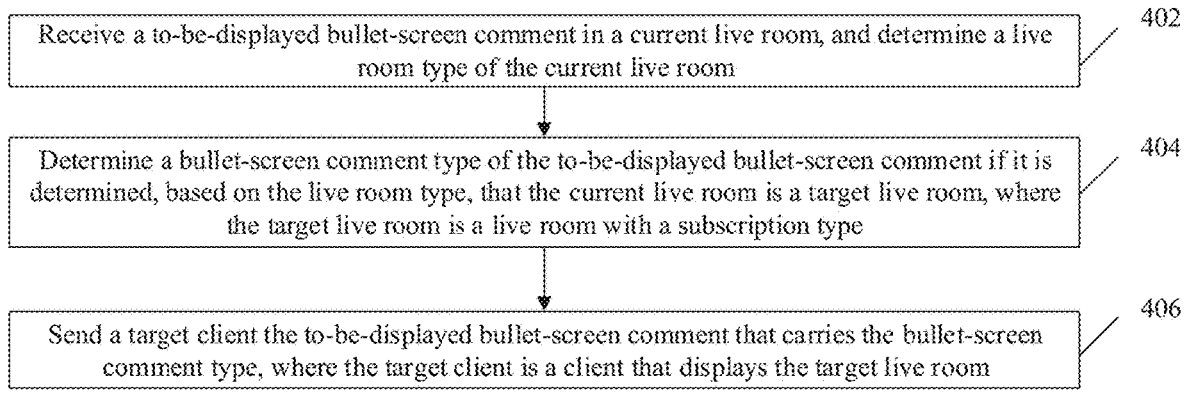
FIG. 4 is a flowchart of another bullet-screen comment display method according to some embodiments of this application.

The foregoing embodiments are some embodiments of the bullet-screen comment display method applied to the client. Some embodiments of a bullet-screen comment display method applied to a server are described below. FIG. 4 is a flowchart of another bullet-screen comment display method according to some embodiments of this application. The method may specifically include the following steps.

Step 402: Receive a to-be-displayed bullet-screen comment in a current live room, and determine a live room type of the current live room.

The to-be-displayed bullet-screen comment is a bullet-screen comment sent by any user who views live streaming in the current live room. There are two live room type: an ordinary live room and a non-ordinary live room.

In this solution, a user enters the live room by using a client, and sends a bullet-screen comment in the live room, and a server receives the bullet-screen comment sent by the user. The bullet-screen comment is not displayed, and therefore is referred to as a to-be-displayed bullet-screen comment. For the ordinary live room, all users view same live content, no distinction is made between camps for sent bullet-screen comments, and all of the bullet-screen comments may be displayed in a general bullet-screen comment display manner. However, for the non-ordinary (for example, a distinction is made between camps) live room, to enable the user to distinguish between a bullet-screen comment from a same camp as the user and a bullet-screen comment from a camp different from that of the user, to-be-displayed bullet-screen comments of different bullet-screen comment types may be displayed in different manners. Therefore, the live room type of the current live room corresponding to the to-be-displayed bullet-screen comment may be first determined, and then how to display the to-be-displayed bullet-screen comment may be determined.

In some embodiments, the received to-be-displayed bullet-screen comment may carry the live room type of the live room, and the server may determine the live room type of the current live room by parsing the to-be-displayed bullet-screen comment, that is, determine whether the current live room is an ordinary live room or a non-ordinary live room.

In some other embodiments, the received to-be-displayed bullet-screen comment may carry a live room identifier of the live room, and the server may record a correspondence between a live room type and a live room identifier, and then may determine, based on the live room identifier, whether the current live room is an ordinary live room or a non-ordinary live room.

In some embodiments of this application, a bullet-screen comment is displayed in different display manners in the ordinary live room and the non-ordinary live room. Therefore, after the to-be-displayed bullet-screen comment is received, the live room type of the current live room may be determined, to subsequently determine how to display the to-be-displayed bullet-screen comment.

Step 404: Determine a bullet-screen comment type of the to-be-displayed bullet-screen comment if it is determined, based on the live room type, that the current live room is a target live room, where the target live room is a live room with a subscription type.

In some embodiments of this application, a live room whose live room type is the non-ordinary type may be referred to as the target live room. If it is determined, based on the live room type, that the current live room is the target live room, a problem of user camp needs to be considered when the to-be-displayed bullet-screen comment is displayed. Therefore, the bullet-screen comment type of the to-be-displayed bullet-screen comment may be determined.

In some embodiments, specific implementation of determining the bullet-screen comment type of the to-be-displayed bullet-screen comment may include:

determining a subscription type, for the target live room, of a user who sends the to-be-displayed bullet-screen comment; and determining the bullet-screen comment type of the to-be-displayed bullet-screen comment based on the subscription type.

That is, the subscription type, for the target live room, of the user who sends the to-be-displayed bullet-screen comment may be determined as the bullet-screen comment type of the to-be-displayed bullet-screen comment. For example, if the user X who sends the to-be-displayed bullet-screen comment selects a camp A in the target live room, it may be determined that the bullet-screen comment type of the to-be-displayed bullet-screen comment is A.

In an example, after the user edits the to-be-displayed bullet-screen comment for the target live room by using a client, the client adds, to the to-be-displayed bullet-screen comment, the subscription type, for the target live room, of the user who sends the to-be-displayed bullet-screen comment, and sends the to-be-displayed bullet-screen comment to the server. In this case, the server can directly obtain the subscription type of the user for the live room, and determine the subscription type as the bullet-screen comment type of the to-be-displayed bullet-screen comment.

In another example, when viewing live streaming by using a client, the user selects the subscription type for the target live room, after detecting an operation of selecting the subscription type by the user, the client may send the subscription type, the live room identifier of the target live room, and a user identifier of the user to the server, and the server correspondingly stores the subscription type, the user identifier, and the live room identifier. When the to-be-displayed bullet-screen comment received by the server carries the live room identifier and the user identifier of the user who sends the to-be-displayed bullet-screen comment, the server may determine the bullet-screen comment type of the to-be-displayed bullet-screen comment based on the user identifier and the live room identifier.

In some embodiments of this application, when it is determined that the current live room is the target live room in which a distinction is made between camps, live content viewed by the user in the current live room is determined based on the subscription type of the user for the target live room, and the to-be-displayed bullet-screen comment sent by the user is closely related to the live content viewed by the user, and therefore the subscription type of the user for the target live room is consistent with the bullet-screen comment type of the bullet-screen comment sent by the user. Therefore, the subscription type, for the target live room, of the user who sends the to-be-displayed bullet-screen comment may be determined as the bullet-screen comment type of the to-be-displayed bullet-screen comment, to improve accuracy of determining the bullet-screen comment type. In addition, the server performs the operation of determining the bullet-screen comment type, and the client performs only a bullet-screen comment rendering operation, and therefore a quantity of occupied resources of the client can be reduced, to improve bullet-screen comment rendering efficiency.

In some other embodiments, the bullet-screen comment type of the to-be-determined bullet-screen comment may be determined based on bullet-screen comment content of the to-be-displayed bullet-screen comment. In an example, a keyword may be extracted from the bullet-screen comment content of the to-be-displayed bullet-screen comment, the keyword may be compared with a keyword library corresponding to each camp, and if there is a word that has a very high similarity to the keyword in a keyword library corresponding to a specific camp, it may be determined that the bullet-screen comment type of the to-be-displayed bullet-screen comment is the camp. For example, it is assumed that there are two camps, namely, an ancient style camp and a modern style camp, in the target live room, and the bullet-screen comment content of the to-be-displayed bullet-screen comment is "this ancient design is very beautiful". In this case, a key word "ancient" may be extracted. "Ancient" has a very high similarity to a keyword "ancient style" in a keyword library corresponding to the ancient style camp, and therefore it may be determined that the bullet-screen comment type of the to-be-displayed bullet-screen comment is the ancient style camp.

In some embodiments of this application, users in different camps view different live content, and therefore bullet-screen comment content of sent to-be-displayed bullet-screen comments differs greatly. Therefore, the bullet-screen comment type of the to-be-displayed bullet-screen comment may be determined based on the bullet-screen comment content of the to-be-displayed bullet-screen comment, to improve accuracy of determining the bullet-screen comment type of the to-be-displayed bullet-screen comment.

Step 406: Send a target client the to-be-displayed bullet-screen comment that carries the bullet-screen comment type, where the target client is a client that displays the target live room.

In some embodiments of this application, after determining the bullet-screen comment type of the to-be-displayed bullet-screen comment, the server may add the bullet-screen comment type to the to-be-displayed bullet-screen comment, and send the to-be-displayed bullet-screen comment to the target client, so that the target client displays the to-be-displayed bullet-screen comment based on the bullet-screen comment type.

In some embodiments, when each user views a live video in the live room, the user may send a to-be-displayed bullet-screen comment for the live room by using a client, the client may send the received to-be-displayed bullet-screen comment to the server, and add, to the to-be-displayed bullet-screen comment, the live room identifier of the live room and a user identifier of the user who sends the bullet-screen comment, and after receiving the to-be-displayed bullet-screen comment, the server first determines, based on the live room identifier, whether the live room is an ordinary live room or a non-ordinary live room (namely, the target live room), and if the live room is the target live room, determines a subscription type of the user for the target live room based on the user identifier, and determines the subscription type as a bullet-screen comment type of the to-be-displayed bullet-screen comment.

Figure 5:
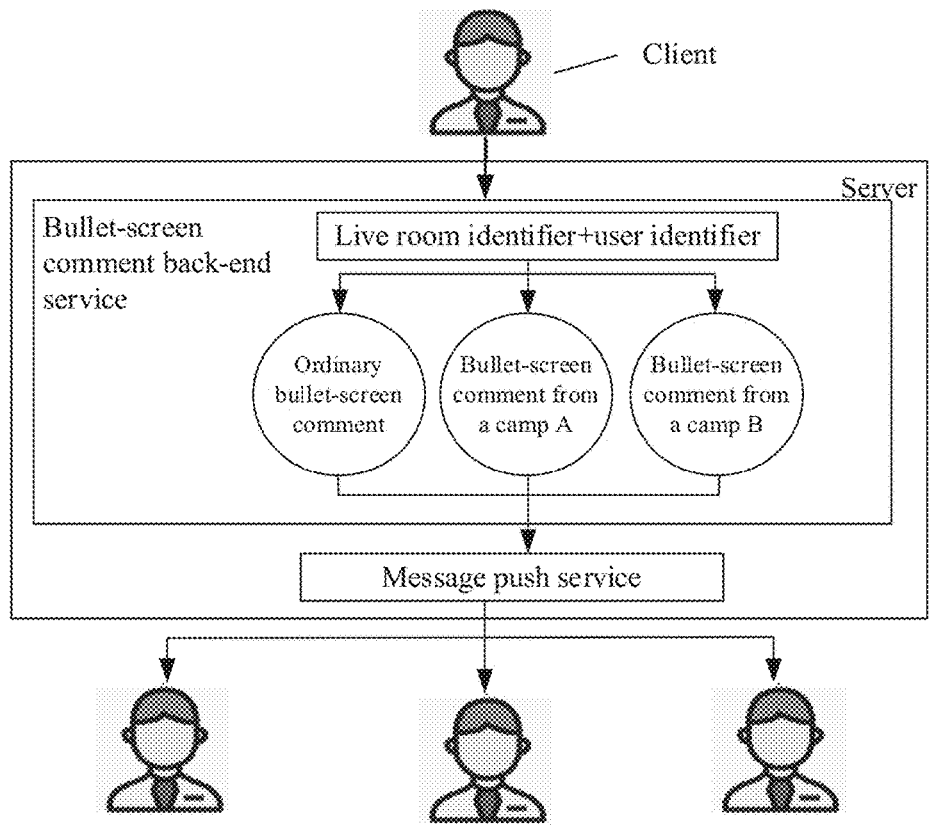
FIG. 5 is a schematic diagram of pushing a bullet-screen comment by a server according to some embodiments of this application.

In an example, FIG. 5 is a schematic diagram of pushing a bullet-screen comment by a server according to some embodiments of this application. If the user sends the to-be-displayed bullet-screen comment in the live room by using the client, the server may receive the to-be-displayed bullet-screen comment, and the to-be-displayed bullet-screen comment carries the live room identifier and the user identifier. The server includes two modules: a bullet-screen comment back-end service module and a message push service module. The bullet-screen comment back-end service module is configured to determine the live room type and the bullet-screen comment type based on the live room identifier and the user identifier. In addition to a bullet-screen comment from the camp A and a bullet-screen comment from a camp B, the bullet-screen comment type may further include an ordinary bullet-screen comment. The message push service module is configured to push the to-be-displayed bullet-screen comment that carries the bullet-screen comment type to the client for display.

For example, if a user Xiaoming opens the target live room zhibojian, and selects a subscription type A in a subscription type selection box displayed on a client, the server stores a correspondence between zhibojian, Xiaoming, and the subscription type A, and the server can determine that a subscription type of the user Xiaoming for the target live room is the subscription type A. A user Xiaohua is also viewing live streaming in the target live room zhibojian, and the user selects a subscription type B. In this case, the server stores a correspondence between zhibojian, Xiaohua, and the subscription type B. After the user Xiaohua sends a bullet-screen comment X in a live room whose live room identifier is zhibojian, it may be determined, based on the live room identifier zhibojian carried in the bullet-screen comment X, that the live room is the target live room, and then it can be determined, based on the correspondence between the user identifier Xiaohua and the subscription type B, that a bullet-screen comment type of the bullet-screen comment X sent by the user Xiaohua is B. The server then adds the bullet-screen comment type B to the bullet-screen comment X. and sends the bullet-screen comment to the client that plays live streaming in the target live room, so that the client displays the bullet-screen comment X based on the bullet-screen comment type B.

In some embodiments of this application, the to-be-displayed bullet-screen comment in the current live room is received, and the live room type of the current live room is determined: if it is determined, based on the live room type, that the current live room is the target live room, the bullet-screen comment type of the to-be-displayed bullet-screen comment is determined; and the to-be-displayed bullet-screen comment that carries the bullet-screen comment type is sent to the target client for display. In this way, based on the bullet-screen comment type of the to-be-displayed bullet-screen comment, a bullet-screen comment from a camp that is the same as that of the user and a bullet-screen comment from a camp that is different from that of the user can be displayed in a differentiated manner. Therefore, a problem that bullet-screen comments of different bullet-screen comment types overlap, cross, and are displayed in a disordered manner can be avoided, and the user who logs in to the client can clearly view bullet-screen comments sent by users in different camps, to enhance fun during live streaming, so as to improve user experience.

It should be noted that based on the descriptions in the foregoing embodiment, the to-be-displayed bullet-screen comment can be displayed in a target display area in the target live room, and the to-be-displayed bullet-screen comment is displayed in a target display direction. In addition, in a process of playing the live video in the target live room, the server may continuously push a live stream to the client. The live stream is a real-time live stream, and therefore the to-be-displayed bullet-screen comment is rendered in real time. Therefore, in a process of determining a target display parameter of the to-be-displayed bullet-screen comment by the client or in a process of rendering the to-be-displayed bullet-screen comment based on a target display parameter by the client, the server may push the live stream to the client to continuously perform live streaming in the target live room on the client.

Figure 6A:
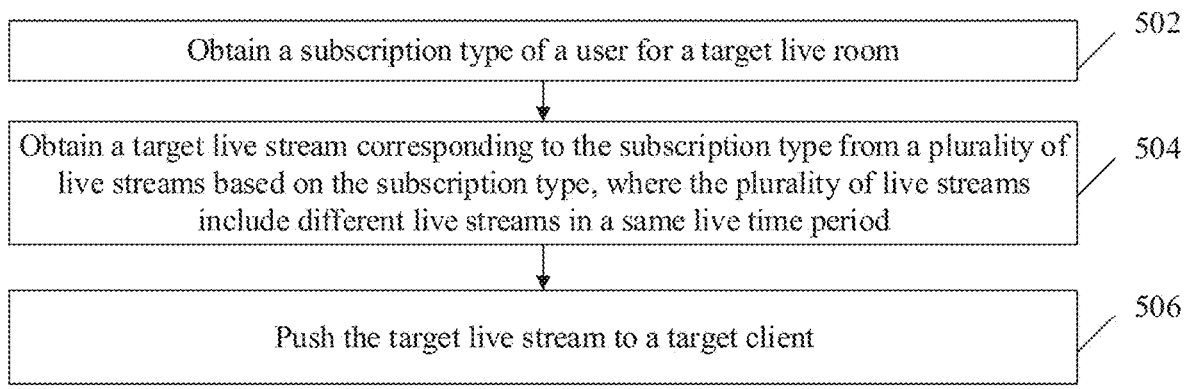
FIG. 6A is a flowchart of a live stream push method according to some embodiments of this application.

Therefore, FIG. 6A is a flowchart of a live stream push method according to some embodiments of this application. The method may specifically include the following steps.

Step 502: Obtain a subscription type of a user for a target live room.

The embodiments corresponding to FIG. 6A is applied to a server of a video live streaming platform.

The user is a user who logs in to a target client to view the target live room.

The user is a user who views a live video by using the client of the video live streaming platform. The user logs in to the client of the video live streaming platform to enter the target live room to view video content of a live video stream pushed by the server.

The target live room is a room in which the user views live content of the live video stream. It should be noted that the target live room may be a live room of one or more live content creators, or may be a live room of a live content play platform, for example, an XXX evening party play platform, an XXX news play platform, or an XXX film and television play platform. The live room of the live content play platform may be correspondingly generated based on subscription information of the user. For example, if the subscription information of the user is "XXX film and television production", the target live room is correspondingly generated based on the subscription information, to play live content of the XXX film and television production.

The subscription type for the target live room is a type of a live video stream to which the user is subscribed. The type of the live video stream may be determined based on time and space, or the type of the live video stream may be determined based on play content. For example, the target live room is the XXX news play platform, and the news play platform can play both international news and domestic news. If the subscription type of the user is domestic news, the subscription type for the target live room is domestic news.

Specifically, a subscription request of the user is received, and the subscription request is parsed to obtain the subscription type of the user for the target live room.

For example, the target live room is an XXX news play platform. In this case, a subscription request Sub_Request of a user XX is received, and the subscription request Sub_Request is parsed to obtain a subscription type of the user XX for the XXX news play platform: domestic news.

After the user performs a subscription operation on the client of the video live streaming platform, the client generates a subscription request, and sends the subscription request to the server, and after receiving the subscription request, the server parses the subscription request to obtain the subscription type of the user for the target live room.

In some embodiments of this application, the subscription type of the user for the target live room is obtained, to lay a reference foundation for subsequently obtaining a target live stream.

Step 504: Obtain a target live stream corresponding to the subscription type from a plurality of live streams based on the subscription type, where the plurality of live streams include different live streams in a same live time period.

The plurality of live streams may be live streams of a plurality of sources sent by a live content scene, or may be live streams of a plurality of sources buffered on the server. Each source may be determined based on a different live content scene, or may be determined based on a different shooting location or uplink stream push path of a same live content scene. The live content scene is a scene on which live content is captured and uplink stream push is performed. For example, for an XXX evening party, there is one main venue and a plurality of branch venues, and each venue is a live content scene. For another example, for a YYY evening party, there is only one venue, a plurality of shooting locations are set, and live streams captured at all the shooting locations and transmitted through uplink stream push are inconsistent.

Specifically, the target live stream corresponding to the subscription type is selected from a plurality of live streams from a content delivery network based on the subscription type.

The content delivery network receives the plurality of live streams transmitted from the live content scene through uplink stream push, and then sends the plurality of live streams to the server. After obtaining the subscription type of the user for the target live stream, the server selects the target live stream corresponding to the subscription type from the plurality of live streams based on the subscription type of the user.

For example, the subscription type of the user is A, and a stream A corresponding to the subscription type A is selected from the plurality of live streams (the stream A, a stream B, a stream C, and a stream D) from the content delivery network.

In an example, the user may open the target live stream on the logged-in client, and then select the subscription type, the client detects an operation of selecting the subscription type by the user, and sends the subscription type, a live room identifier of the target live room, and a user identifier to the server, and the server first determines the plurality of live streams in the target live room based on the live room identifier, and then obtains the target live stream corresponding to the subscription type from the plurality of live streams.

In some embodiments of this application, the corresponding target live stream is obtained from the plurality of live streams based on the subscription type of the user for the target live stream, to lay a foundation for subsequently displaying the target live stream.

Step 506: Push the target live stream to the target client.

The target client is a client in to which the user logs.

The target client is a client of the video live streaming platform on a target terminal. The target terminal may be a mobile terminal with a different operating system or a non-mobile terminal with a different operating system. This is not limited herein. The client may be an application program client of the video live streaming platform, or may be a network page client of the video live streaming platform. This is not limited herein.

Displaying the target live stream in the target live stream is displaying, in a live video play area in the target live room, live content determined based on the target live stream.

Specifically, the target live stream is pushed to the target client, so that the target client pulls stream information in the target live stream, and plays the live content corresponding to the target live stream in the target live room based on the stream information.

For example, the target live stream A is pushed to the client of the video live streaming platform, so that the client of the video live streaming platform pulls stream information info_A in the target live stream A, and plays the live content corresponding to the target live stream A in the target live room, namely, the XXX news play platform, based on the stream information info_A: domestic news.

In some embodiments of this application, the target live stream corresponding to the subscription type is obtained from the plurality of different live streams in the same live time period based on the subscription type of the user for the target live room, and the target live stream is pushed to the target client to be displayed and played in the target live room. In this way, play content in the target live room is not bounded to the target live stream, but may be flexibly adjusted based on the subscription type of the user for the target live room, so that there are more diversified types for the target live room, and there is richer and more diversified live content.

In some embodiments, the subscription type includes a live stream spatiotemporal identifier.

Correspondingly, step 504 includes the following specific step:

determining a target live time period based on the live stream spatiotemporal identifier, and obtaining the target live stream corresponding to the subscription type from a plurality of live streams in the target live time period.

There may be more than one target live stream corresponding to the subscription type of the user, and when the subscription type of the user includes the live stream spatiotemporal identifier, it indicates that the user requires the target live stream to be displayed in the target live time period in the target live room. Therefore, if a target live stream in a non-target time period is obtained, there is poor user experience.

The live stream spatiotemporal identifier is an identifier used to mark the target live time period in which the target live stream is displayed in the target live room. For example, if the user subscribes to a live room of an XXX countdown party, and a time of a live content scene corresponding to the countdown party is 20:00-1:00, the live stream spatiotemporal identifier is "20:00-1:00", and the target live stream is displayed in the target live room in the target live time period 20:00-1:00.

Specifically, the subscription type is identified to determine the live stream spatiotemporal identifier, the target live time period is determined based on the live stream spatiotemporal identifier, and the target live stream corresponding to the subscription type is obtained from the plurality of live streams in the target live time period.

For example, the plurality of live streams are a stream A, a stream B, and a stream C, the target live room is a live room of an XXX content creator, the user subscribes to the target live stream C at 19:00 in the target live room, and the subscription type is "19:00 and stream C". In this case, the subscription type "19:00 and stream C" is identified to determine that the live stream spatiotemporal identifier is "19:00", the target live time period is determined based on the live stream spatiotemporal identifier "19:00", and the target live stream C corresponding to the subscription type "19:00 and stream C" is obtained from the plurality of live streams (the stream A, the stream B, and the stream C) at 19:00.

The target live time period is determined based on the live stream spatiotemporal identifier, and the target live stream corresponding to the subscription type is obtained from the plurality of live streams in the target live time period, so that the target live stream corresponding to the live stream spatiotemporal identifier in the subscription type of the user can be more accurately obtained, to meet a requirement of the user for a live time in the target live room and improve user experience.

In some embodiments, before step 502, the method further includes the following specific step: identifying a room type of the target live room.

Correspondingly, step 502 includes the following specific step:

obtaining the subscription type of the user for the target live room if the room type is a multi-stream room type.

In a manner of identifying the room type of the target live room, a delivery system is searched for the room type of the target live room.

The delivery system is a system that records a correspondence between a live room on the video live streaming platform and a room type and a correspondence between a live time period and a room type. The server searches the delivery system to determine the room type of the target live room.

The room type of the target live room is a live stream type that is preset by the server and that can be displayed in the target live room, and includes the multi-stream room type and a single-stream room type.

In the multi-stream room type, the target live stream corresponding to the subscription type of the user can be obtained from the plurality of live streams, and can be displayed.

In the single-stream room type, the target live stream cannot be obtained from the plurality of live streams for display.

Specifically, the room type of the target live room is identified by searching the delivery system, and if the room type is the multi-stream room type, the subscription type of the user for the target live room is obtained.

For example, it is identified, by searching the delivery system based on the correspondence between the live room and the room type (live room 1—multi-stream room type, live room 2—multi-stream room type, and live room 3—single-stream room type), that the room type of the target live room 2 is the multi-stream room type, and the subscription type of the user for the target live room is obtained.

The room type of the target live room is identified, and the subscription type of the user for the target live room is obtained only when the room type is the multi-stream room type, to avoid a case in which the subscription type of the user is obtained when the room type is not the multi-stream room type and avoid unnecessary subsequent processing of determining the target live stream in the plurality of live streams, so as to improve live stream push efficiency and improve user experience.

In some embodiments, the identifying a room type of the target live room includes the following specific steps:
sending a search request to the delivery system, where the search request includes a room identifier of the target live room; and
receiving a search result fed back by the delivery system, where the search result carries the room type of the target live room.

The server sends the search request to the delivery system, and the correspondence between the live room and the room type and/or the correspondence between the live time period and the room type recorded in the delivery system are/is searched based on the room identifier of the target live room, to obtain the search result that carries the room type.

The room identifier is an identifier determined based on attribute information of the live room on the video live streaming platform. For example, for the live room of the XXX live content creator, a room identifier of the live room is "XXX".

Specifically, the search request is sent to the delivery system, where the search request includes the room identifier of the target live room, so that the delivery system searches the correspondence based on the room identifier of the target live room, to obtain the search result; and
the search result fed back by the delivery system is received, where the search result carries the room type of the target live room.

For example, the search request Search_Request is sent to the delivery system, where the search request Search_Request includes the room identifier "XXX" of the target live room, so that the delivery system searches the correspondence (XXX live room—multi-stream room type) based on the room identifier "XXX" of the target live room; and the search result Search_Result fed back by the delivery system is received, where the search result Search_Result carries the room type "multi-stream room type" of the target live room.

The delivery system may be searched by using the room identifier of the target live room. Therefore, it is ensured that different users can determine a consistent room type of the target live room on video live streaming platforms on operating systems of different terminals, and subsequently obtain the target live stream from the plurality of live streams, and display the target live stream, to ensure consistency of the target live room in the system, avoid a case in which the user cannot obtain the corresponding room type, and display the corresponding target live stream in the target live room, so as to improve user experience.

In some embodiments, the search request further includes a live stream spatiotemporal identifier; and the search result is found by the delivery system from a room type configuration list based on the live stream spatiotemporal identifier. The room type configuration list records the correspondence between the live time period and the room type of the live room.

The room type configuration list is a list, in the delivery system, that records the correspondence between the live room and the room type and/or the correspondence between the live time period and the room type.

The delivery system determines the corresponding room type in the target live time period in the target live room by searching the room type list.

Table 2 shows a room type configuration list according to some embodiments of this application.

For example, a room type configuration list of a target live room YYY is shown in Table 2, and a correspondence between three live time periods in the live room and room types is recorded. The delivery system receives a search request sent by the server, where the search request carries a live stream spatiotemporal identifier "13:00-19:00" of the target live room YYY, and obtains, by searching the room type configuration list of the target live room YYY, that a room type of the target live room YYY in a target live time period 13:00-19:00 is the multi-stream room type. Further, the subscription type of the user for the target live room may be obtained, and further the corresponding target live stream may be obtained from the plurality of live streams, and displayed in the target live room YYY on the target client.

TABLE 2

Room type configuration list of the target live room YYY

| Live room (room identifier) | Live time period | Room type |
|---|---|---|
| YYY | 8:00-12:00 | Multi-stream room type |
| YYY | 13:00-19:00 | Multi-stream room type |
| YYY | 20:00-1:00 | Single-stream room type |

The room type configuration list is set in the delivery system, and therefore search may be performed based only on the live stream spatiotemporal identifier, to obtain the search result of the room type of the target live room in the target time period. In this way, search efficiency is improved, and therefore entire live stream push efficiency is improved, to improve user experience. In addition, the room type configuration list records the live time period and the room type, which indicates that the room type of the live room flexibly changes with adjustment of the live time period. Therefore, there is richer live content in the target live room. In this way, not only a fixed live stream is obtained for display, but also user experience is improved.

In some embodiments, after the room type of the target live room is identified, the method further includes the following specific steps:

determining a primary live stream if the room type is the single-stream room type; and pushing the primary live stream to the target client.

The single-stream room type is a room type that is recorded in the delivery system and in which the target live stream cannot be obtained from the plurality of live streams, and cannot be displayed. For example, the target live room is an XXX film and television production play platform, which imposes a limitation that only an XXX film and television production can be played in the target live room. Therefore, the target live stream cannot be obtained from the plurality of live streams, and the XXX film and television production play platform has a single live stream.

The primary live stream is a live stream that is considered by default by the content delivery system and that is of live content delivered in the target live room. For example, the target live room is the XXX film and television production play platform, and has only one live stream, namely, a stream S, corresponding to live content that is the XXX film and television production, and the stream S is the primary live stream.

Specifically, if the room type is the single-stream room type, the primary live stream is determined, and the primary live stream is pushed to the target client, so that the target client pulls stream information in the primary live stream, and plays live content corresponding to the primary live stream in the target live room based on the stream information.

For example, if the target live room is the XXX film and television production play platform, and it is identified that the room type of the target live room is the single-stream room type, the primary live stream is the stream S, and the primary live stream S is pushed to the client of the video live streaming platform, so that the client of the video live streaming platform pulls stream information info_S in the primary live stream S, and plays the live content corresponding to the primary live stream S in the target live room, namely, the XXX film and television production play platform, based on the stream information info_S: XXX film and television production.

If the room type is the single-stream room type, the primary live stream is determined, and the primary live stream is pushed to the target client. The room type of the target live room may be flexibly set to the single-stream room type, to meet a requirement of the user for displaying and playing the single target live stream, further enrich the type of the live room and the live content, and improve user experience.

In some embodiments of this application, the target live room is a live room in which a distinction is made between camps. The user selects the subscription type, so that a camp to which the user belongs can be determined, and then the target live stream corresponding to the camp to which the user belongs is obtained from the plurality of video streams in the live room for display by the client. Therefore, different live content can be displayed in a same live time period in a same live room based on different subscription types, to enhance fun during live streaming.

In some embodiments, after the target live stream corresponding to the subscription type is obtained from the plurality of live streams based on the subscription type, the method further includes the following specific steps:

determining a target background map of the target live room based on the subscription type; and sending the target background map to the target client.

The target background map is a corresponding background map preset for the plurality of corresponding live streams, and the target live room is configured. For example, the plurality of live streams that can be obtained in the target live room include a live stream in an ancient style and a live stream in a fashion style, a background map in the ancient style is set for the corresponding live stream in the ancient style, and a background map in the fashion style is set for the corresponding live stream in the fashion style.

The target client configures the target background map in a background display area in the target live room.

Specifically, the target background map of the target live room is determined based on the subscription type, and the target background map is sent to the target client.

For example, it is determined, based on the subscription type "XXX countdown party at 9:00", that there is a live program in the ancient style in the XXX countdown party at 9:00, it is determined, based on the subscription type "9:00", that the target background map of the target live room is a background map in the ancient style, and the background map in the ancient style is sent to the target client.

The target background map of the target live room is determined based on the subscription type, and the target background map is displayed in the target live room, so that the user can view a bullet-screen comment determined based on the subscription type of the user. In this way, the live content in the target live room is enriched, and adaptability to the user is reflected, to improve user experience.

In another possible implementation of this application, in a process of obtaining the target live stream corresponding to the subscription type from the plurality of live streams based on the subscription type or after the target live stream is obtained, the steps in the foregoing bullet-screen comment display embodiments may be performed.

In an example, the target live stream displayed in the target live room has a bullet-screen comment display function. After the target live stream is obtained, bullet-screen comment configuration is performed on the target live stream to further enrich the displayed live content.

A to-be-displayed bullet-screen comment is a bullet-screen comment entered by the user in a bullet-screen comment input area in the target live room on the target client, is converted into a bullet-screen comment stream by using a bullet-screen comment conversion module in the target client, is added to the target live stream, and is displayed in the target live room. For example, the user enters a bullet-screen comment "666" in the bullet-screen comment input area in the target live room, converts the bullet-screen comment into a bullet-screen comment stream Bullet_stream by using the bullet-screen comment conversion module in the target client, and adds the bullet-screen comment stream to the target live stream.

For example, the target live room is an XXX countdown party, users who view the party online are grouped into two camps: a camp A and a camp B, and the plurality of live streams include a stream A set for the camp A and a stream B set for the camp B. A subscription type of a user in the camp A is "A", a target live stream obtained based on the subscription type is the stream A, a to-be-displayed bullet-screen comment entered by the user in the camp A in the target live room is "camp A comes on", when the subscription type "A" is consistent with a bullet-screen comment type, a target display parameter of the to-be-displayed bullet-screen comment corresponding to the subscription type "A" is determined: {bullet-screen comment trajectory of the to-be-displayed bullet-screen comment: from right to left: bullet-screen comment text style of the to-be-displayed bullet-screen comment: red and bold; display area of the to-be-displayed bullet-screen comment: upper part of a display area in the target live room}, and the target display parameter (bullet-screen comment trajectory of the to-be-displayed bullet-screen comment: from right to left; bullet-screen comment text style of the to-be-displayed bullet-screen comment: red and bold; display area of the to-be-displayed bullet-screen comment: upper part of the display area in the target live room} is sent to a target client of the user in the camp A, so that the target client renders the to-be-displayed bullet-screen comment "camp A comes on" in the target live stream based on the target display parameter. Correspondingly, a to-be-displayed bullet-screen comment entered by a user in the camp B in the target live room is "camp B comes on", when a subscription type "B" is consistent with a bullet-screen comment type, a target display parameter of the to-be-displayed bullet-screen comment corresponding to the subscription type "B" is determined: {bullet-screen comment trajectory of the to-be-displayed bullet-screen comment: from left to right; bullet-screen comment text style of the to-be-displayed bullet-screen comment: blue and bold: display area of the to-be-displayed bullet-screen comment: lower part of the display area in the target live room}, and the target display parameter {bullet-screen comment trajectory of the to-be-displayed bullet-screen comment; from left to right; bullet-screen comment text style of the to-be-displayed bullet-screen comment: blue and bold; display area of the to-be-displayed bullet-screen comment: lower part of the display area in the target live room} is sent to a target client of the user in the camp B, so that the target client renders the to-be-displayed bullet-screen comment "camp B comes on" in a target live stream based on the target display parameter. In addition, the user in the camp A and the user in the camp B may view the rendered bullet-screen comments "camp A comes on" and "camp B comes on" from the camp A and the camp B in live streaming of the target live streams "XXX countdown party" displayed in the target live room "XXX countdown party" on the respective clients.

In the foregoing example, bullet-screen comments are rendered based on subscription types of different users, so that richer bullet-screen comments are displayed in the target live room, to enhance a sense of participation of the user in viewing live streaming and improve user experience.

The target display parameter of the corresponding to-be-displayed bullet-screen comment is determined based on the subscription type and the bullet-screen comment type, and then the to-be-displayed bullet-screen comment is rendered based on the target display parameter and displayed in the target live stream, so that the user can view a bullet-screen comment determined based on the subscription type of the user. In this way, the live content in the target live room is enriched, and adaptability to the user is reflected, to improve user experience.

Figure 6B:
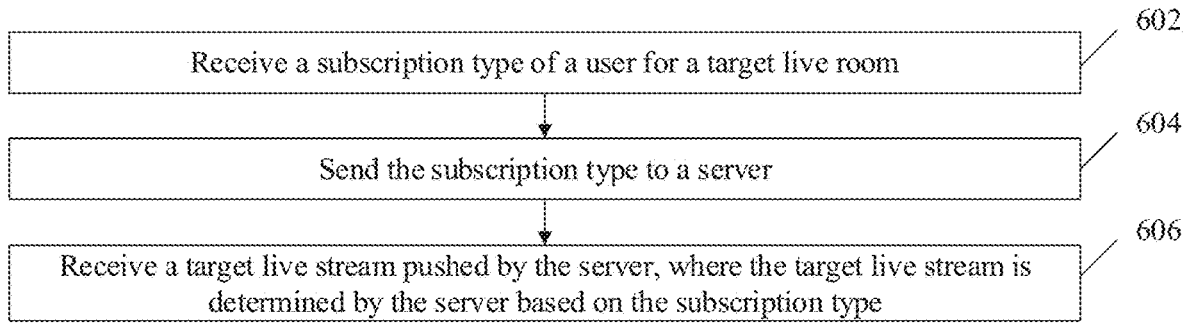
FIG. 6B is a flowchart of a live stream pull method according to some embodiments of this application.

FIG. 6B is a flowchart of a live stream pull method according to some embodiments of this application. The method specifically includes the following steps.

Step 602: Receive a subscription type of a user for a target live room.

The embodiments in FIG. 6B is applied to a client of a video live streaming platform.

Specifically, a plurality of subscription type options are displayed in the target live room, and the subscription type of the user for the target live room is received.

The subscription type is a subscription type selected by the user based on the plurality of subscription type options displayed in the target live room.

For example, subscription types, namely, a multi-stream room type and a single-stream room type, are displayed in a target live room, namely, an XXX news play platform, and a user XX selects the multi-stream room type live room based on the displayed subscription types.

The subscription type of the user for the target live room is received, to lay a reference foundation for determining a corresponding target live stream by a server.

Step 604: Send the subscription type to the server.

Specifically, a subscription request is sent to the server. The subscription request includes the subscription type of the user for the target live room.

For example, a subscription request Sub_Request is sent to the server, and the subscription request Sub_Request includes the subscription type of the user XX for the target live room, namely, the XXX news play platform: multi-stream room type.

The subscription type is sent to the server, so that the subscription type can be used by the server as a reference to determine the target live stream, to lay a foundation for subsequently receiving the target live stream pushed by the server.

Step 606: Receive the target live stream pushed by the server, where the target live stream is determined by the server based on the subscription type.

The target live stream includes stream information, and the client may play corresponding live content in the target live room based on the stream information.

Specifically, the target live stream pushed by the server is received. The target live stream includes the stream information.

For example, a target live stream A pushed by the server is received, and the target live stream includes stream information info_A.

In some embodiments of this application, the subscription type of the user for the target live room is received; the subscription type is sent to the server, and the target live stream pushed by the server is received, where the target live stream is determined by the server based on the subscription type. In this way, play content in the target live room is not bounded to the target live stream, but may be flexibly adjusted based on the subscription type of the user for the target live room, so that there are more diversified types for the target live room, and there is richer and more diversified live content.

In some embodiments, after step 606, the method further includes the following specific step:

displaying the target live stream in the target live room when it is identified that the user enters the target live room.

Specifically, when it is identified that the user enters the target live room, the live content corresponding to the target live stream is played in the target live room based on the stream information.

For example, when it is identified that the user enters the target live room, live content corresponding to the target live stream A is played in the target live room, namely, the XXX news play platform, based on the stream information info_A: domestic news.

The target live stream is obtained in advance, and when it is identified that the user enters the target live room, the target live stream is displayed, so that the user can directly display the target live stream without pulling the target live stream from the server, to improve user experience.

In some embodiments, the embodiments of the live stream pull method of this application further includes the following specific steps:

receiving a target display parameter sent by the server, where the target display parameter is determined by the server based on the subscription type and a bullet-screen comment type; and rendering a to-be-displayed bullet-screen comment in the target live room in the target live stream based on the target display parameter.

A rendering manner of rendering the to-be-displayed bullet-screen comment is to render the to-be-displayed bullet-screen comment by using a preset rendering template based on the target display parameter.

Specifically, the target display parameter sent by the server is received, and the to-be-displayed bullet-screen comment is rendered by using the preset rendering template based on the target display parameter.

For example, the target display parameter (bullet-screen comment trajectory of the to-be-displayed bullet-screen comment: from right to left; bullet-screen comment text style of the to-be-displayed bullet-screen comment: red and bold; display area of the to-be-displayed bullet-screen comment: upper part of a display area in the target live room) sent by the server is received. The to-be-displayed bullet-screen comment "camp A comes on" is rendered by using the preset rendering template based on the target display parameter.

The target display parameter sent by the server is received, and the to-be-displayed bullet-screen comment is rendered in the target live stream based on the target display parameter, to enrich the live content in the target live room and improve user experience.

In some embodiments, before the step of displaying the target live stream in the target live room, the method further includes the following specific steps:

receiving a target background map sent by the server, where the target background map is determined by the server based on the subscription type: and displaying the target background map in the target live room.

Displaying the target background map in the target live room is specifically displaying the target background map in a background display area in the target live room.

The background display area is a display area other than a play window, a comment display area, and a recommended content area in the target live room, and may be located at a top of the target live room, at a bottom of the target live room, or in a bottom area of a display layer in the target live room.

Specifically, the target background map sent by the server is received, and the target background map is displayed in the background display area in the target live room.

For example, a background map, in an ancient style, sent by the server is received, and the background map in the ancient style is displayed in the background display area in the target live room.

The target background map sent by the server is received, and the target background map is displayed in the target live room. In this way, the live content in the target live room is enriched, and adaptability to the user is reflected, to improve user experience.

Figure 7:
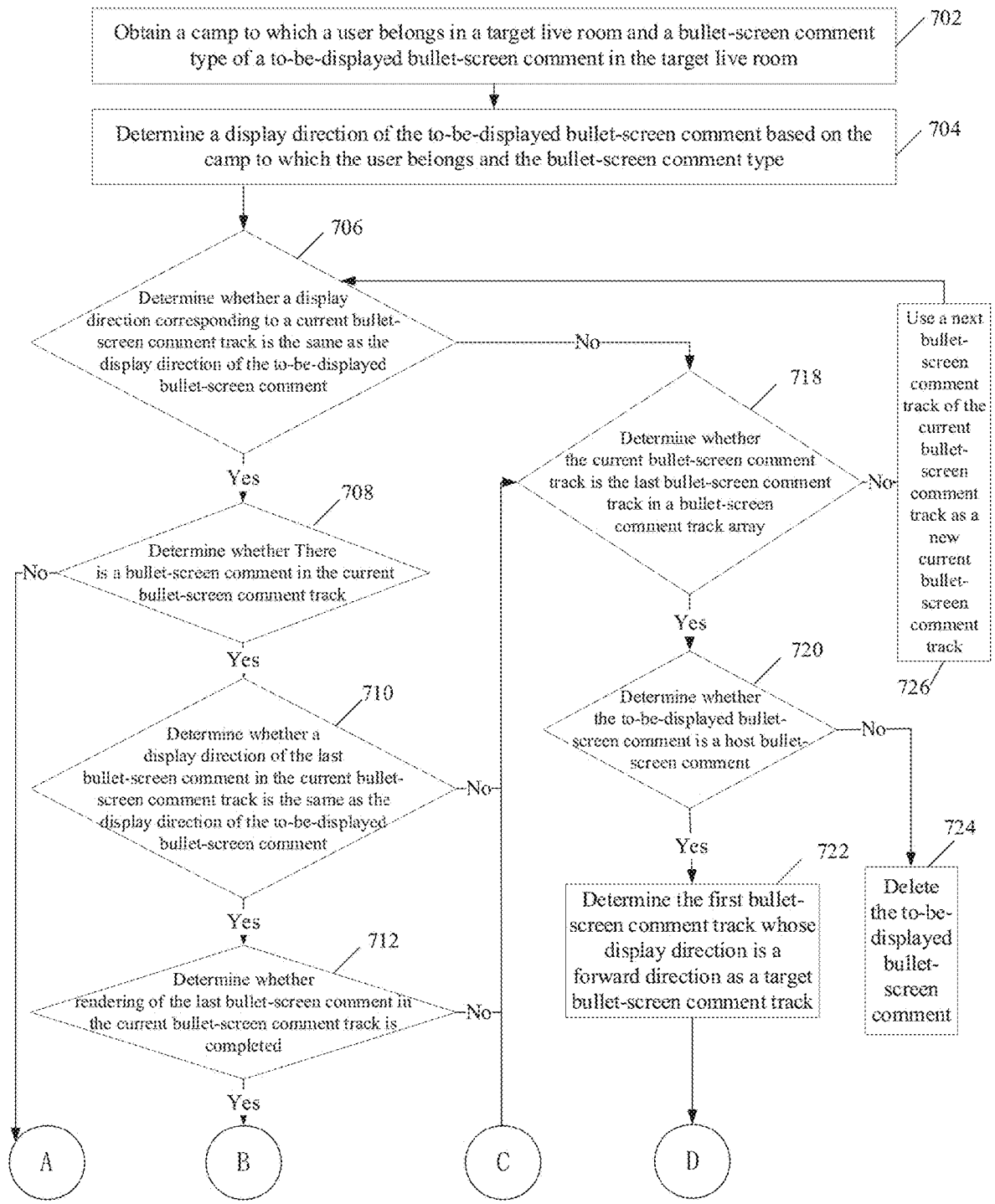
FIG. 7 is a processing flowchart of a bullet-screen comment display method applied to a live room in which a distinction is made between camps according to some embodiments of this application.
Figure 7:
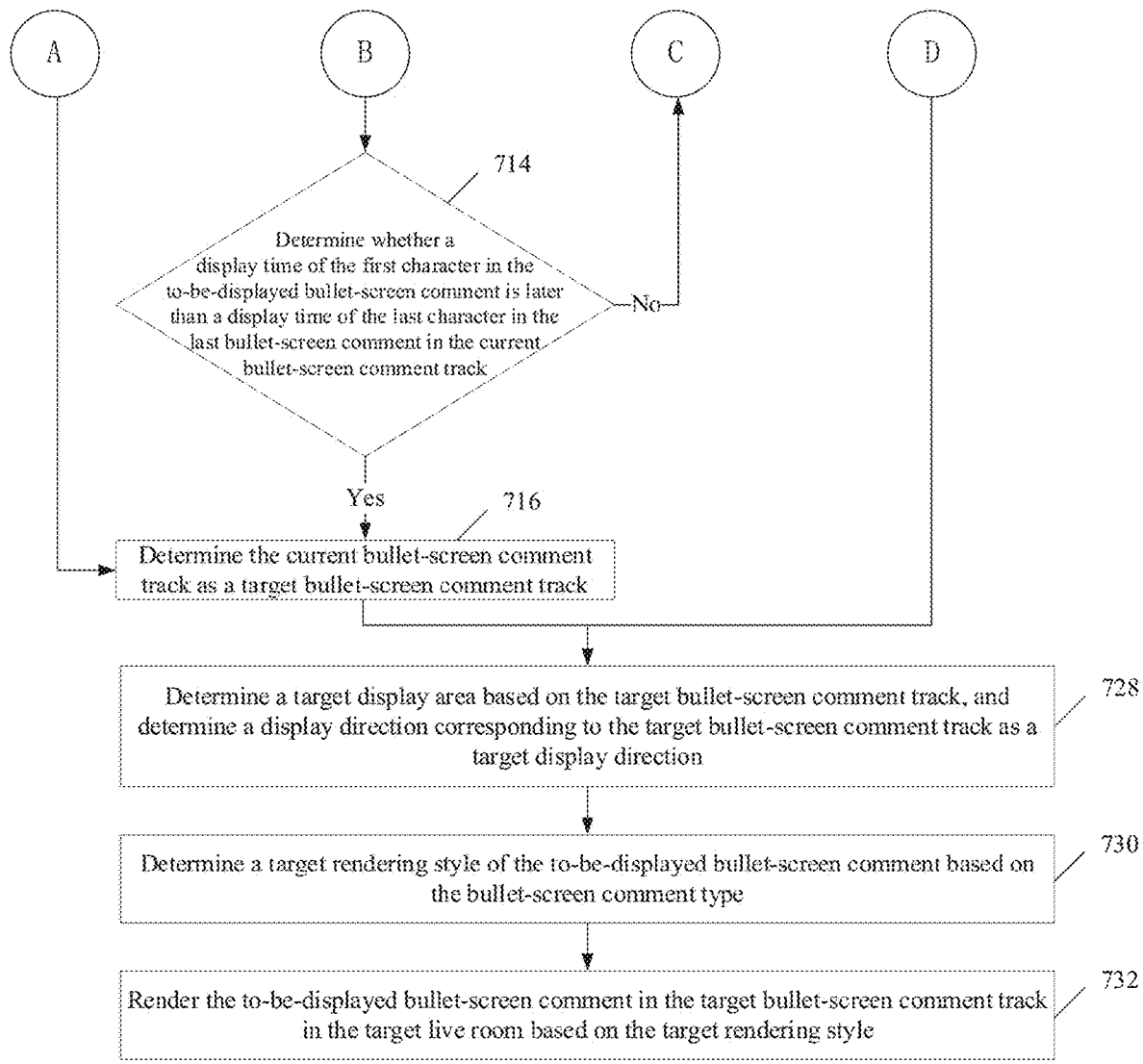

With reference to FIG. 7, the bullet-screen comment display method provided in this application is further described below by using an example in which the bullet-screen comment display method is applied to a live room in which a distinction is made between camps. FIG. 7 is a processing flowchart of a bullet-screen comment display method applied to a live room in which a distinction is made between camps according to some embodiments of this application. The method specifically includes the following steps.

Step 702: Obtain a camp to which a user belongs in a target live room and a bullet-screen comment type of a to-be-displayed bullet-screen comment in the target live room.

For example, a target client in to which a user Xiaoming logs displays a bullet-screen comment. If the user Xiaoming selects a camp A when viewing live streaming, the to-be-displayed bullet-screen comment is sent by Xiaohua, and Xiaohua selects a camp B when viewing live streaming, the camp to which the user belongs is A. and the bullet-screen comment type of the to-be-displayed bullet-screen comment is B.

Step 704: Determine a display direction of the to-be-displayed bullet-screen comment based on the camp to which the user belongs and the bullet-screen comment type.

For example, if the camp A to which the user belongs is different from the bullet-screen comment type B, the display direction of the to-be-displayed bullet-screen comment is a reverse direction (from left to right).

Step 706: Determine whether a display direction corresponding to a current bullet-screen comment track is the same as the display direction of the to-be-displayed bullet-screen comment, and perform step 708 if the display direction corresponding to the current bullet-screen comment track is the same as the display direction of the to-be-displayed bullet-screen comment, or perform step 718 if the display direction corresponding to the current bullet-screen comment track is different from the display direction of the to-be-displayed bullet-screen comment.

For example, referring to FIG. 3, if the current bullet-screen comment track is a fourth bullet-screen comment track in FIG. 3, the display direction corresponding to the current bullet-screen comment track is a forward direction, and it may be determined that the display direction corresponding to the current bullet-screen comment track is different from the display direction of the to-be-displayed bullet-screen comment, and in this case, step 718 is performed.

Step 708: Determine whether there is a bullet-screen comment in the current bullet-screen comment track, and perform step 710 if there is a bullet-screen comment in the current bullet-screen comment track, or perform step 716 if there is no bullet-screen comment in the current bullet-screen comment track.

Step 710: Determine whether a display direction of the last bullet-screen comment in the current bullet-screen comment track is the same as the display direction of the to-be-displayed bullet-screen comment, and perform step 712 if the display direction of the last bullet-screen comment in the current bullet-screen comment track is the same as the display direction of the to-be-displayed bullet-screen comment, or perform step 718 if the display direction of the last bullet-screen comment in the current bullet-screen comment track is different from the display direction of the to-be-displayed bullet-screen comment.

Step 712: Determine whether rendering of the last bullet-screen comment in the current bullet-screen comment track is completed, and perform step 714 if rendering of the last bullet-screen comment in the current bullet-screen comment track is completed, or perform step 718 if rendering of the last bullet-screen comment in the current bullet-screen comment track is not completed.

Step 714: Determine whether a display time of the first character in the to-be-displayed bullet-screen comment is later than a display time of the last character in the last bullet-screen comment in the current bullet-screen comment track, and perform step 716 if the display time of the first character in the to-be-displayed bullet-screen comment is later than the display time of the last character in the last bullet-screen comment in the current bullet-screen comment track, or perform step 718 if the display time of the first character in the to-be-displayed bullet-screen comment is not later than the display time of the last character in the last bullet-screen comment in the current bullet-screen comment track.

Step 716: Determine the current bullet-screen comment track as a target bullet-screen comment track.

Continuing with the foregoing example, if there is a bullet-screen comment in the fourth bullet-screen comment track, the display direction of the last bullet-screen comment is the same as the display direction of the to-be-displayed bullet-screen comment, rendering of the last bullet-screen comment is completed, and the display time of the first character in the to-be-displayed bullet-screen comment is later than the display time of the last character in the last bullet-screen comment in the current bullet-screen comment track, the fourth bullet-screen comment track is determined as the target bullet-screen comment track.

Step 718: Determine whether the current bullet-screen comment track is the last bullet-screen comment track in a bullet-screen comment track array, and perform step 720 if the current bullet-screen comment track is the last bullet-screen comment track in the bullet-screen comment track array, or perform step 726 if the current bullet-screen comment track is not the last bullet-screen comment track in the bullet-screen comment track array.

Continuing with the foregoing example, if the fourth bullet-screen comment track is not the last bullet-screen comment track in the bullet-screen comment track array, step 726 is performed.

Step 720: Determine whether the to-be-displayed bullet-screen comment is a host bullet-screen comment, and perform step 722 if the to-be-displayed bullet-screen comment is a host bullet-screen comment, or perform step 724 if the to-be-displayed bullet-screen comment is not a host bullet-screen comment.

Step 722: Determine a first bullet-screen comment track whose display direction is a forward direction as a target bullet-screen comment track.

Step 724: Delete the to-be-displayed bullet-screen comment.

Continuing with the foregoing example, if the fourth bullet-screen comment track is not the last bullet-screen comment track in the bullet-screen comment track array, it is determined whether the to-be-displayed bullet-screen comment is sent by Xiaoming. If the to-be-displayed bullet-screen comment is sent by Xiaoming, the first bullet-screen comment track is determined as the target bullet-screen comment track. If the to-be-displayed bullet-screen comment is not sent by Xiaoming. the to-be-displayed bullet-screen comment is deleted.

Step 726: Use a next bullet-screen comment track of the current bullet-screen comment track as a new current bullet-screen comment track, and perform step 706 again.

Continuing with the foregoing example, a fifth bullet-screen comment track is used as the new current bullet-screen comment track, and step 706 is performed again.

Step 728: Determine a target display area based on the target bullet-screen comment track, and determine a display direction corresponding to the target bullet-screen comment track as a target display direction.

Step 730: Determine a target rendering style of the to-be-displayed bullet-screen comment based on the bullet-screen comment type.

Step 732: Render the to-be-displayed bullet-screen comment in the target bullet-screen comment track in the target live room based on the target rendering style.

According to the bullet-screen comment display method provided in this application, the camp to which the user belongs in the target live room and the bullet-screen comment type of the to-be-displayed bullet-screen comment in the target live room are obtained; the display direction of the to-be-displayed bullet-screen comment is first determined based on the camp to which the user belongs and the bullet-screen comment type; then the bullet-screen comment track in the bullet-screen comment track array is traversed; and when the display direction corresponding to the current bullet-screen comment track is the same as the display direction of the to-be-displayed bullet-screen comment, it is determined, based on whether there is a bullet-screen comment in the current bullet-screen comment track, whether the display direction of the last bullet-screen comment in the current bullet-screen comment track is the same as the display direction of the to-be-displayed bullet-screen comment, whether rendering of the last bullet-screen comment in the current bullet-screen comment track is completed, and whether the display time of the first character in the to-be-displayed bullet-screen comment is later than the display time of the last character in the last bullet-screen comment in the current bullet-screen comment track, whether the current bullet-screen comment track can be determined as the target bullet-screen comment track; or when the display direction corresponding to the current bullet-screen comment track is different from the display direction of the to-be-displayed bullet-screen comment, and when the current bullet-screen comment track is not the last bullet-screen comment track, it is further determined whether the next bullet-screen comment track can be used as the target bullet-screen comment track; or when the current bullet-screen comment track is the last bullet-screen comment track, the host bullet-screen comment sent by the user who logs in to the client is displayed in the bullet-screen comment track whose display direction is the forward direction. The display area and the display direction of the to-be-displayed bullet-screen comment can be determined by performing the foregoing determining operations one by one. A bullet-screen comment from a camp that is the same as that of the user and a bullet-screen comment from a camp that is different from that of the user are displayed in different display areas based on different display directions. Therefore, bullet-screen comment display manners are enriched, to-be-displayed bullet-screen comments of different bullet-screen comment types can be clearly distinguished based on different display directions, a problem that the bullet-screen comments of different bullet-screen comment types overlap, cross, and are displayed in a disordered manner can be avoided by using different display areas, and the user who logs in to the client can clearly view bullet-screen comments sent by users in different camps, to enhance fun during live streaming, so as to improve user experience.

Figure 8:
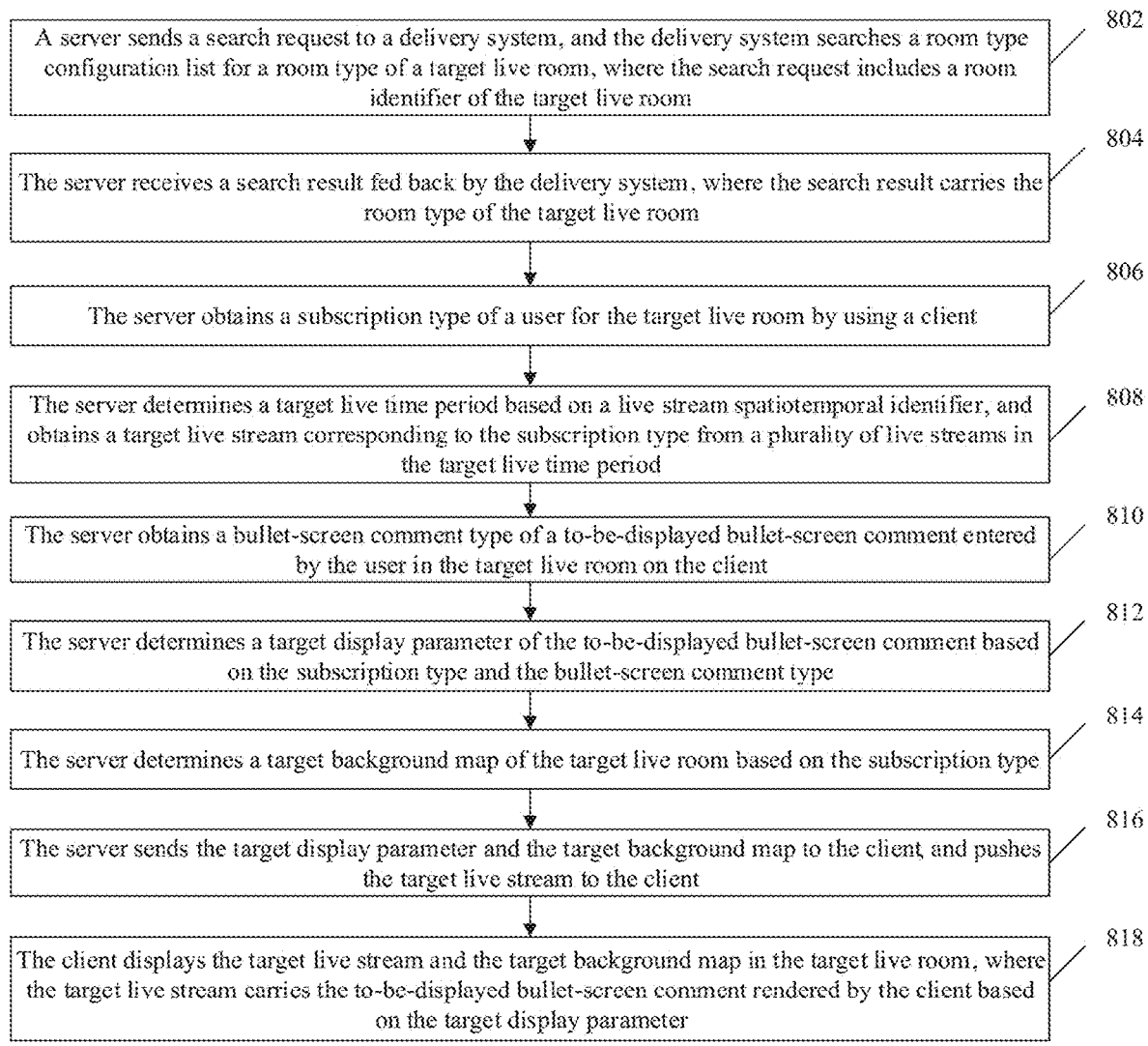
FIG. 8 is a processing flowchart of a live stream push method applied to a video live streaming platform system according to some embodiments of this application.

With reference to FIG. 8, the live stream push method provided in this application is further described below by using an example in which the live stream push method is applied to live stream push. FIG. 8 is a processing flowchart of a live stream push method applied to a video live streaming platform system according to some embodiments of this application. The method specifically includes the following steps.

Step 802: A server sends a search request to a delivery system, and the delivery system searches a room type configuration list for a room type of a target live room. where the search request includes a room identifier of the target live room.

The embodiments of this application are applied to a video live streaming platform system that includes a server, a client, and a delivery system. The server is a server of an XX video live streaming platform, the client is a client of the XX video live streaming platform on an operating system of an XX mobile terminal, and the delivery system records a room type configuration list of a live room, a live time period, and a room type on the XX video live streaming platform.

The target live room is an XXX activity live room, and a room identifier of the XXX activity live room is "XXX activity".

A room type of the XXX activity live room is a multi-stream room type.

The server of the XX video live streaming platform sends a search request to the delivery system, and the delivery system searches the room type configuration list for the room type "multi-stream room type" of the target live room, where the search request includes the room identifier "XXX activity" of the XXX activity live room.

Step 804: The server receives a search result fed back by the delivery system, where the search result carries the room type of the target live room.

The server of the XX video live streaming platform receives a search result fed back by the delivery system. The search result carries the room type of the XXX activity live room, and the room type is the multi-stream room type.

Step 806: The server obtains a subscription type of a user for the target live room by using a client.

A user A subscribes to the XXX activity live room in advance on the client on the operating system of the XX mobile terminal.

A subscription type of the user A for the XXX activity live room is "20:00-1:00, stream A, XXX activity".

The server of the XX video live streaming platform obtains the subscription type "20:00-1:00, stream A. XXX activity" of the user A for the XXX activity live room by using the client on the operating system of the XX mobile terminal.

Step 808: The server determines a target live time period based on a live stream spatiotemporal identifier, and obtains a target live stream corresponding to the subscription type from a plurality of live streams in the target live time period.

The plurality of live streams include the stream A, a stream B, and a stream C.

A live stream spatiotemporal identifier in the subscription type "20:00-1:00, stream A, XXX Activity" is "20:00-1:00".

The server of the XX video live streaming platform determines a target live time period 20:00-1:00 based on the live stream spatiotemporal identifier "20:00-1:00", and obtains a target live stream A corresponding to the subscription type "20:00-1:00, stream A, XXX activity" from a plurality of live streams, namely, the stream A, the stream B, and the stream C, in 20:00-1:00.

Step 810: The server obtains a bullet-screen comment type of a to-be-displayed bullet-screen comment entered by the user in the target live room on the client.

A to-be-displayed bullet-screen comment entered by the user A in the XXX activity live room on the client is "233333".

A bullet-screen comment type of the to-be-displayed bullet-screen comment is a "stream A bullet-screen comment type".

The server of the XX video live streaming platform obtains the bullet-screen comment type "stream A bullet-screen comment type" of the to-be-displayed bullet-screen comment "233333" entered by the user A in the XXX activity live room on the client.

Step 812: The server determines a target display parameter of the to-be-displayed bullet-screen comment based on the subscription type and the bullet-screen comment type.

A target display parameter of the to-be-displayed bullet-screen comment whose bullet-screen comment type is the "stream A bullet-screen comment type" is {bullet-screen comment trajectory of the to-be-displayed bullet-screen comment: from right to left: bullet-screen comment text style of the to-be-displayed bullet-screen comment: red and bold; display area of the to-be-displayed bullet-screen comment: upper part of a display area in the target live room}.

The server of the XX video live streaming platform determines the target display parameter {bullet-screen comment trajectory of the to-be-displayed bullet-screen comment: from right to left; bullet-screen comment text style of the to-be-displayed bullet-screen comment: red and bold: display area of the to-be-displayed bullet-screen comment: upper part of the display area in the target live room} of the to-be-displayed bullet-screen comment based on the subscription type "20:00-1:00, stream A, XXX activity" and the bullet-screen comment type "stream A bullet-screen comment type".

Step 814: The server determines a target background map of the target live room based on the subscription type.

The target background map of the target live room is an XXX activity background map corresponding to the stream A.

The server of the XX video live streaming platform determines, based on the subscription type "20:00-1:00, stream A, XXX activity", that a target background map of the XXX activity live room is the XXX activity background map corresponding to the stream A.

Step 816: The server sends the target display parameter and the target background map to the client, and pushes the target live stream to the client.

The server of the XX video live streaming platform sends the target display parameter {bullet-screen comment trajectory of the to-be-displayed bullet-screen comment: from right to left: bullet-screen comment text style of the to-be-displayed bullet-screen comment: red and bold; display area of the to-be-displayed bullet-screen comment: upper part of the display area in the target live room} and the XXX activity background map corresponding to the stream A to the client on the operating system of the XX mobile terminal, and pushes the target live stream A to the client on the operating system of the XX mobile terminal.

Step 818: The client displays the target live stream and the target background map in the target live room, where the target live stream carries the to-be-displayed bullet-screen comment rendered by the client based on the target display parameter.

The client on the operating system of the XX mobile terminal displays the target live stream A and the XXX activity background map in the XXX activity live room. The target live stream A carries the to-be-displayed bullet-screen comment "233333" rendered by the client based on the target display parameter (bullet-screen comment trajectory of the to-be-displayed bullet-screen comment: from right to left; bullet-screen comment text style of the to-be-displayed bullet-screen comment: red and bold: display area of the to-be-displayed bullet-screen comment: upper part of the display area in the target live room).

In some embodiments of this application, first, the server obtains the room type of the target live room through searching by using the delivery system, classifies the target live room, and marks the target live room with the uniform room identifier, so that the user can subscribe to different live content at a same time, and the target live stream can be accurately displayed in the target live room on different systems. Then, the target live stream in the plurality of live streams is obtained based on the subscription type of the user for the target live room, so that the live stream that can be displayed in the target live room can be flexibly adjusted based on the subscription type of the user for the target live room, and there is richer and more diversified live content in the target live room. Finally, the to-be-displayed bullet-screen comment is rendered based on the subscription type, and the target background map is determined. In this way, the live content in the target live room is enriched, and targeted configuration of the video live streaming platform for the user is reflected, to improve user experience.

Figure 9:
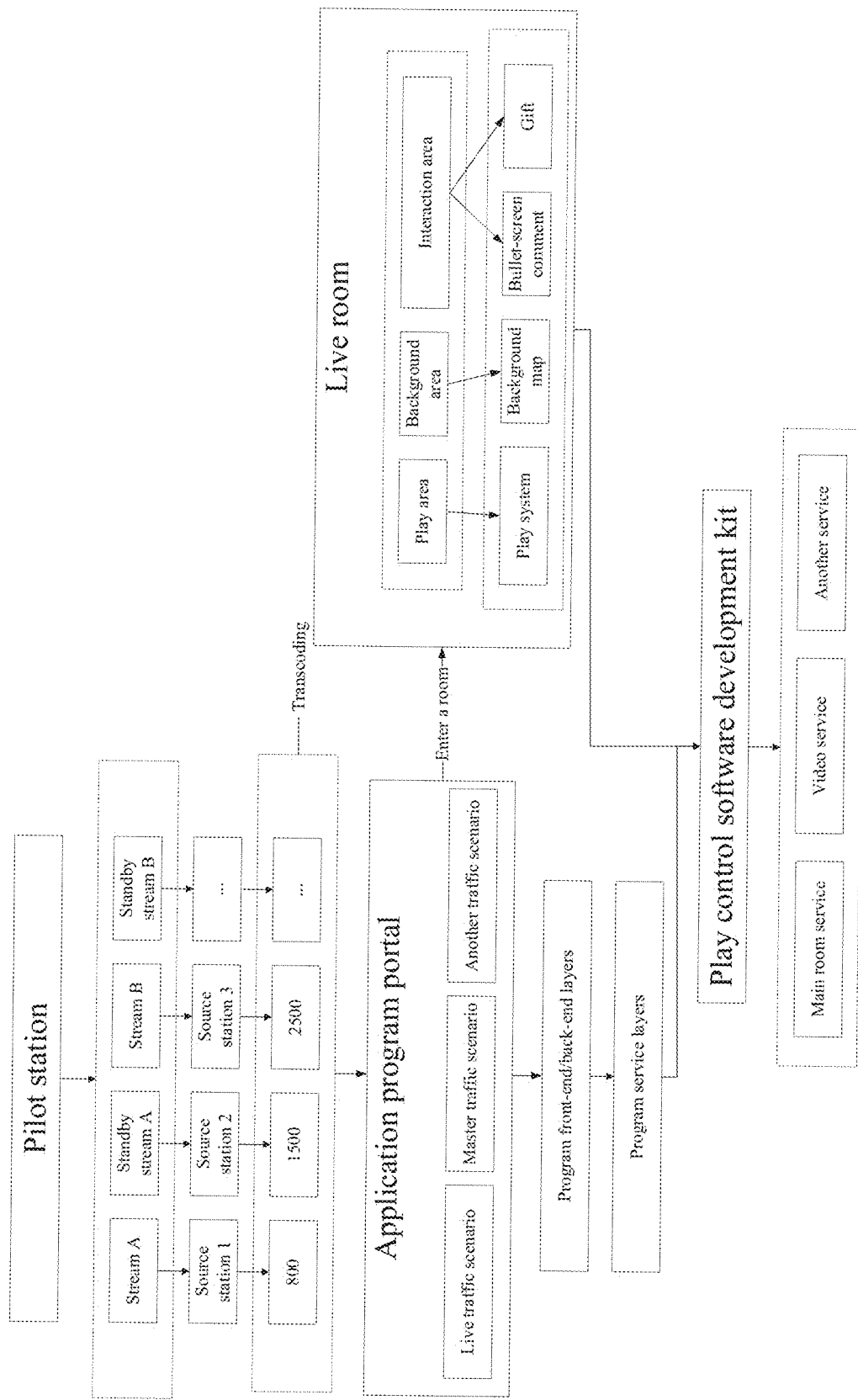
FIG. 9 is a data processing flowchart of a live stream push method applied to a video live streaming platform system according to some embodiments of this application.

FIG. 9 is a data processing flowchart of a live stream push method and a live stream pull method applied to a video live streaming platform system according to some embodiments of this application.

A pilot station distributes a plurality of live streams, namely, a stream A, a standby stream A, a stream B. and a standby stream B. determines a source station (a source station 1, a source station 2, a source station 3, and the like) for each corresponding live stream. transcodes (800, 1500, 2500, and the like) each live stream corresponding to each source station, and then allocates a transcoded live stream to an application program portal. so that a user obtains a corresponding live stream by using a live room on a client for display. The application program portal includes a live traffic scenario portal, a master traffic scenario portal, and another traffic scenario portal. A live traffic scenario is a list scenario, namely, an address that is of a live stream to which the user subscribes and that is determined before the user enters the live room. The user enters the live room by using each application program portal. The application live room includes a play area, a background area, and an interaction area. The play area corresponds to a play system, the background area corresponds to a background map, and the interaction area corresponds to a bullet-screen comment and a gift that can be used by the user to interact. A main room service, a video service, and another service in the live room are provided to the user by using a play control software development kit based on an operation performed by the user in the live room and program front-end/back-end layers and service layers of an application program connected to the application portal.

Figure 10:
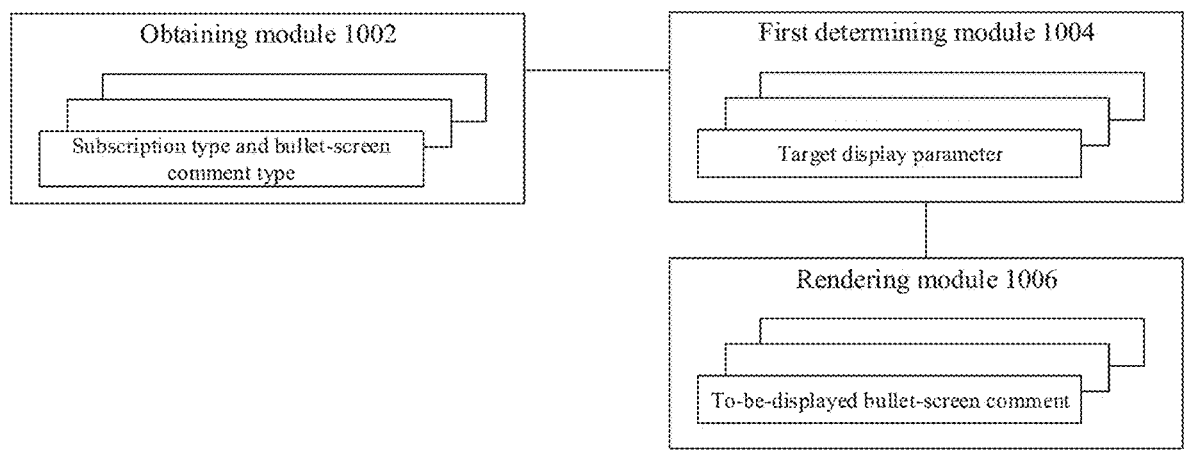
FIG. 10 is a schematic diagram of a structure of a bullet-screen comment display apparatus according to some embodiments of this application.

Corresponding to the foregoing method embodiments applied to a client, this application further provides bullet-screen comment display apparatus embodiments applied to a client. FIG. 10 is a schematic diagram of a structure of a bullet-screen comment display apparatus according to some embodiments of this application. As shown in FIG. 10. the apparatus includes:

an obtaining module 1002, configured to obtain a subscription type of a user for a target live room and a bullet-screen comment type of a to-be-displayed bullet-screen comment in the target live room;

a first determining module 1004, configured to determine a target display parameter of the to-be-displayed bullet-screen comment based on the subscription type and the bullet-screen comment type, where the target display parameter includes a target display area and a target display direction, and different bullet-screen comment types correspond to different display areas and display directions; and a rendering module 1006, configured to render the to-be-displayed bullet-screen comment in the target display area in the target live room based on the target display direction.

In one or more embodiments of this application, the first determining module 1004 is further configured to:

determine a display direction of the to-be-displayed bullet-screen comment based on the subscription type and the bullet-screen comment type;

obtain a bullet-screen comment track array, where the bullet-screen comment track array includes a plurality of bullet-screen comment tracks in a bullet-screen comment display area in the target live room and a display direction corresponding to each bullet-screen comment track;

determine a target bullet-screen comment track from the bullet-screen comment track array based on the display direction of the to-be-displayed bullet-screen comment and the display direction corresponding to each bullet-screen comment track; and determine the target display area based on the target bullet-screen comment track, and determine a display direction corresponding to the target bullet-screen comment track as the target display direction.

In one or more embodiments of this application, the first determining module 1004 is further configured to:

if the subscription type is the same as the bullet-screen comment type, determine that the display direction of the to-be-displayed bullet-screen comment is a forward direction; or if the subscription type is different from the bullet-screen comment type, determine that the display direction of the to-be-displayed bullet-screen comment is a reverse direction.

In one or more embodiments of this application, the first determining module 1004 is further configured to:

identify whether a display direction corresponding to a current bullet-screen comment track is the same as the display direction of the to-be-displayed bullet-screen comment, where the current bullet-screen comment track is any bullet-screen comment track in the bullet-screen comment track array; and if the display direction corresponding to the current bullet-screen comment track is the same as the display direction of the to-be-displayed bullet-screen comment, determine the target bullet-screen comment track from the bullet-screen comment track array based on bullet-screen comment information in the current bullet-screen comment track; or if the display direction corresponding to the current bullet-screen comment track is different from the display direction of the to-be-displayed bullet-screen comment, determine the target bullet-screen comment track based on an identification result indicating whether the current bullet-screen comment track is a designated bullet-screen comment track.

In one or more embodiments of this application, the first determining module 1004 is further configured to:

when the current bullet-screen comment track is not the designated bullet-screen comment track, identify whether a display direction corresponding to a next bullet-screen comment track of the current bullet-screen comment track is the same as the display direction of the to-be-displayed bullet-screen comment.

In one or more embodiments of this application, the first determining module 1004 is further configured to:

when the current bullet-screen comment track is the designated bullet-screen comment track, if the to-be-displayed bullet-screen comment is a host bullet-screen comment, select a bullet-screen comment track whose display direction is the forward direction from the bullet-screen comment track array as the target bullet-screen comment track.

In one or more embodiments of this application, the first determining module 1004 is further configured to:

identify, based on a quantity of bullet-screen comments, whether there is a bullet-screen comment in the current bullet-screen comment track; and if there is no bullet-screen comment in the current bullet-screen comment track, determine the current bullet-screen comment track as the target bullet-screen comment track.

In one or more embodiments of this application, the first determining module 1004 is further configured to:

if there is a bullet-screen comment in the current bullet-screen comment track, determine whether a quantity of bullet-screen comments that have been rendered in the current bullet-screen comment track reaches a preset threshold; and if the quantity of bullet-screen comments that have been rendered in the current bullet-screen comment track reaches the preset threshold, determine the target bullet-screen comment track based on the identification result indicating whether the current bullet-screen comment track is the designated bullet-screen comment track.

In one or more embodiments of this application, the first determining module 1004 is further configured to:

if the quantity of bullet-screen comments that have been rendered in the current bullet-screen comment track does not reach the preset threshold, determine whether a display time of the first character in the to-be-displayed bullet-screen comment is later than a display time of the last character in a target bullet-screen comment, where the target bullet-screen comment is the last bullet-screen comment that has been rendered in the current bullet-screen comment track; and if the display time of the first character in the to-be-displayed bullet-screen comment is later than the display time of the last character in the target bullet-screen comment, determine the current bullet-screen comment track as the target bullet-screen comment track.

In one or more embodiments of this application, the first determining module 1004 is further configured to:

determine whether a display direction of the target bullet-screen comment is the same as the display direction of the to-be-displayed bullet-screen comment, where the target bullet-screen comment is the last bullet-screen comment that has been rendered in the current bullet-screen comment track; and if the display direction of the target bullet-screen comment is the same as the display direction of the to-be-displayed bullet-screen comment, determine whether the quantity of bullet-screen comments that have been rendered in the current bullet-screen comment track reaches the preset threshold.

In one or more embodiments of this application, the obtaining module 1002 is further configured to:

determine the bullet-screen comment display area in a live interface of the target live room;

divide the bullet-screen comment display area into a first display area and a second display area based on a bullet-screen comment display rule, where the first display area and the second display area correspond to different display directions;

determine a bullet-screen comment track in each of the first display area and the second display area based on a preset bullet-screen comment track width; and determine the bullet-screen comment track and a display direction corresponding to each bullet-screen comment track as a bullet-screen comment track array, where the display direction corresponding to each bullet-screen comment track is the same as a display direction corresponding to a display area in which each bullet-screen comment track is located.

In one or more embodiments of this application, the rendering module 1006 is further configured to:

determine a target rendering style of the to-be-displayed bullet-screen comment based on the bullet-screen comment type; and render the to-be-displayed bullet-screen comment in the target display area in the target live room based on the target display direction and the target rendering style.

According to the bullet-screen comment display apparatus provided in this application, the subscription type of the user for the target live room and the bullet-screen comment type of the to-be-displayed bullet-screen comment in the target live room are obtained; the target display parameter of the to-be-displayed bullet-screen comment is determined based on the subscription type and the bullet-screen comment type, where the target display parameter includes the target display area and the target display direction, and different bullet-screen comment types correspond to different display areas and display directions; and the target display parameter is sent to a target client, so that the target client renders the to-be-displayed bullet-screen comment in the target display area in the target live room based on the target display direction, where the target client is a client in to which the user logs. In the foregoing manner, for bullet-screen comments of different bullet-screen comment types, based on the subscription type of the user for the target live room, a bullet-screen comment from a camp that is the same as that of the user and a bullet-screen comment from a camp that is different from that of the user are displayed in different display areas based on different display directions. Therefore, bullet-screen comment display manners are enriched, to-be-displayed bullet-screen comments of different bullet-screen comment types can be clearly distinguished based on different display directions, a problem that the bullet-screen comments of different bullet-screen comment types overlap, cross, and are displayed in a disordered manner can be avoided by using different display areas, and the user who logs in to the client can clearly view bullet-screen comments sent by users in different camps, to enhance fun during live streaming, so as to improve user experience.

A schematic solution of the bullet-screen comment display apparatus in the embodiments is described above. It should be noted that the technical solution of the bullet-screen comment display apparatus and the technical solution of the foregoing bullet-screen comment display method applied to a client belong to a same concept. For details not described in detail in the technical solution of the bullet-screen comment display apparatus, refer to the descriptions of the technical solution of the foregoing bullet-screen comment display method applied to a client.

Figure 11:
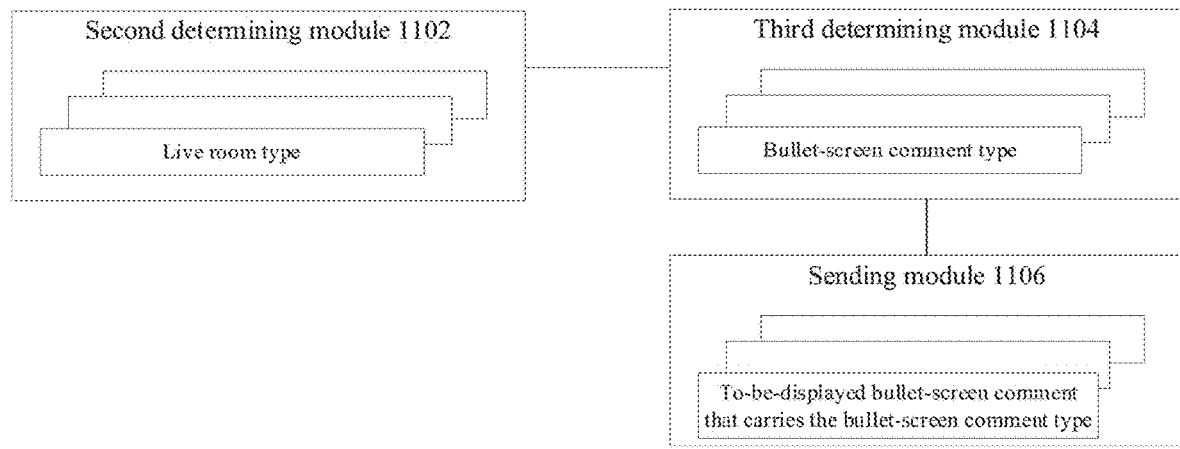
FIG. 11 is a schematic diagram of a structure of another bullet-screen comment display apparatus according to some embodiments of this application.

Corresponding to the foregoing method embodiments applied to a server, this application further provides bullet-screen comment display apparatus embodiments applied to a server. FIG. 11 is a schematic diagram of a structure of another bullet-screen comment display apparatus according to some embodiments of this application. As shown in FIG. 11, the apparatus includes:

a second determining module 1102, configured to: receive a to-be-displayed bullet-screen comment in a current live room, and determine a live room type of the current live room;

a third determining module 1104, configured to determine a bullet-screen comment type of the to-be-displayed bullet-screen comment if it is determined, based on the live room type, that the current live room is a target live room, where the target live room is a live room with a subscription type; and a sending module 1106, configured to send a target client the to-be-displayed bullet-screen comment that carries the bullet-screen comment type, where the target client is a client that displays the target live room.

In one or more embodiments of this application, the third determining module 1104 is further configured to:

determine a subscription type, for the target live room, of a user who sends the to-be-displayed bullet-screen comment; and determine the bullet-screen comment type of the to-be-displayed bullet-screen comment based on the subscription type.

In one or more embodiments of this application, the apparatus further includes a stream push module, and the stream push module is configured to:

obtain a subscription type of a user for the target live room;

obtain a target live stream corresponding to the subscription type from a plurality of live streams based on the subscription type, where the plurality of live streams include different live streams in a same live time period; and push the target live stream to the target client.

The bullet-screen comment display apparatus provided in this application receives the to-be-displayed bullet-screen comment in the current live room, and determines the live room type of the current live room; if it is determined, based on the live room type, that the current live room is the target live room, determines the bullet-screen comment type of the to-be-displayed bullet-screen comment: and sends, to the target client, the to-be-displayed bullet-screen comment that carries the bullet-screen comment type for display. In this way, based on the bullet-screen comment type of the to-be-displayed bullet-screen comment, a bullet-screen comment from a camp that is the same as that of the user and a bullet-screen comment from a camp that is different from that of the user can be displayed in a differentiated manner. Therefore, a problem that bullet-screen comments of different bullet-screen comment types overlap, cross, and are displayed in a disordered manner can be avoided, and the user who logs in to the client can clearly view bullet-screen comments sent by users in different camps, to enhance fun during live streaming, so as to improve user experience.

A schematic solution of the bullet-screen comment display apparatus in the embodiments is described above. It should be noted that the technical solution of the bullet-screen comment display apparatus and the technical solution of the foregoing bullet-screen comment display method applied to a server belong to a same concept. For details not described in detail in the technical solution of the bullet-screen comment display apparatus, refer to the descriptions of the technical solution of the foregoing bullet-screen comment display method applied to a server.

Figure 12:
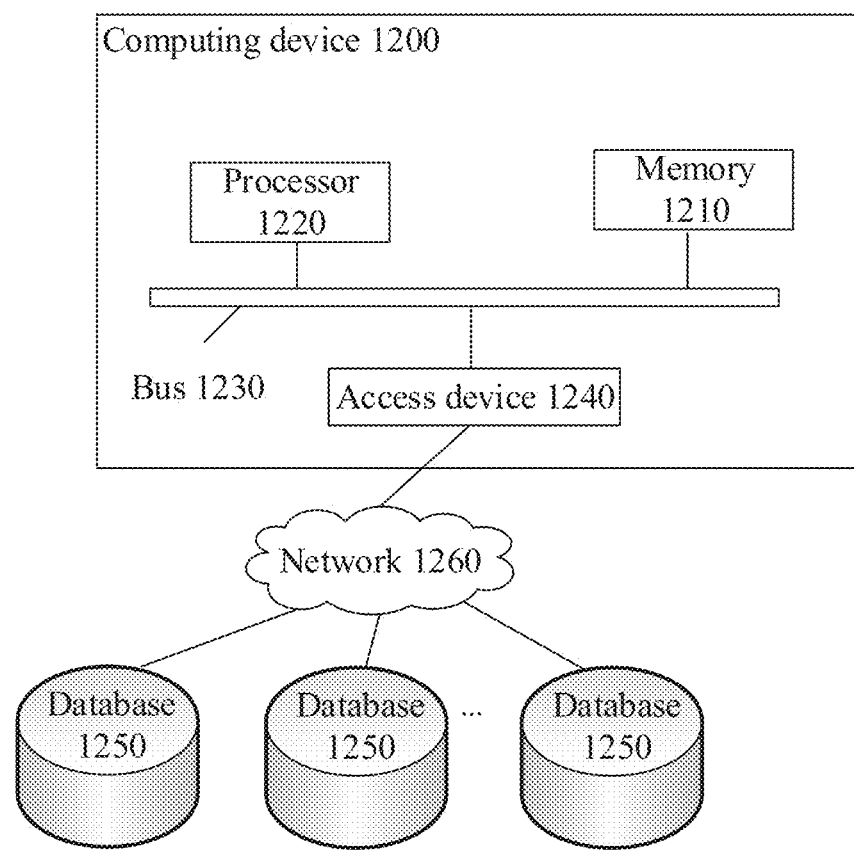
FIG. 12 is a block diagram of a structure of a computing device according to some embodiments of this application.

FIG. 12 is a block diagram of a structure of a computing device 1200 according to some embodiments of this application. Components of the computing device 1200 include but are not limited to a memory 1210 and a processor 1220. The processor 1220 and the memory 1210 are connected by using a bus 1230, and a database 1250 is configured to store data.

The computing device 1200 further includes an access device 1240, and the access device 1240 enables the computing device 1200 to communicate via one or more networks 1260.

Examples of these networks include a public switched telephone network (PSTN), a local area network (LAN), a wide area network (WAN), a personal area network (PAN), or a combination of communication networks such as the Internet. The access device 1240 may include one or more of any type of wired or wireless network interface (for example, a network interface controller (NIC)), for example, an IEEE 802.11 wireless local area network (WLAN) wireless interface, a worldwide interoperability for microwave access (WiMAX) interface, an Ethernet interface, a universal serial bus (USB) port, a cellular network interface, a Bluetooth interface, or a near field communication (NFC) interface.

In some embodiments of this application, the foregoing components of the computing device 1200 and other components not shown in FIG. 12 may alternatively be connected to each other, for example, by using the bus. It should be understood that the block diagram of the structure of the computing device shown in FIG. 12 is merely used as an example instead of a limitation on the scope of this application. A person skilled in the art may add or replace other components as required.

The computing device 1200 may be any type of static or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a static computing device such as a desktop computer or a PC. The computing device 1200 may alternatively be a mobile or static server.

The processor 1220 performs the steps of the bullet-screen comment display method when executing the computer instructions.

A schematic solution of the computing device in the embodiments is described above. It should be noted that the technical solution of the computing device and the technical solution of the bullet-screen comment display method belong to a same concept. For details not described in detail in the technical solution of the computing device, refer to the descriptions of the technical solution of the bullet-screen comment display method.

Some embodiments of this application further provide a computer-readable storage medium. The computer-readable storage medium stores computer instructions. When the computer instructions are executed by a processor, the steps of the bullet-screen comment display method are implemented.

A schematic solution of the computer-readable storage medium in the embodiments is described above. It should be noted that the technical solution of the storage medium and the technical solution of the bullet-screen comment display method belong to a same concept. For details not described in detail in the technical solution of the storage medium, refer to the descriptions of the technical solution of the bullet-screen comment display method.

Specific embodiments of this application are described above. Other embodiments fall within the scope of the appended claims. In some cases, actions or steps described in the claims may be performed in an order different from those in the embodiments and desired results may still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program code. The computer program code may be in a source code form, an object code form, an executable file form, an intermediate form, or the like. The computer-readable medium may include any entity or apparatus that can carry the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like. It should be noted that content included in the computer-readable medium may be appropriately added or deleted based on requirements of legislation and patent practice in a jurisdiction. For example, in some jurisdictions, according to legislation and patent practice, the computer-readable medium includes neither an electrical carrier signal nor a telecommunications signal.

It should be noted that for ease of description, the foregoing method embodiments are described as a combination of a series of actions. However, a person skilled in the art should understand that this application is not limited to the described action order, because according to this application, some steps may be performed in another order or simultaneously. In addition, a person skilled in the art should also understand that the embodiments described in this specification are all embodiments, and involved actions and modules are not necessarily mandatory to this application.

In the foregoing embodiments, descriptions of the embodiments have respective focuses. For a part that is not described in detail in some embodiments, refer to related descriptions in another embodiment.

The embodiments of this application disclosed above are merely intended to help describe this application. In the optional embodiments, all details are not described in detail, and the present invention is not limited to the specific implementations. Obviously, many modifications and changes may be made based on the content of this application. These embodiments are selected and specifically described in this application to better explain the principle and the actual application of this application, so that a person skilled in the art can better understand and use this application. This application is only subjected to the claims and the scope of equivalents thereof.

What is claimed is:

1. A method, applied to a client of a first user, and comprising:
    obtaining a subscription type of the first user for a target live room and a bullet-screen comment type of a to-be-displayed bullet-screen comment from a second user in the target live room, wherein the subscription type corresponds to a user camp, and different live videos are played in the target live room for users with different subscription types at a same time point;
    determining a target display parameter of the to-be-displayed bullet-screen comment based on the subscription type and the bullet-screen comment type, wherein the target display parameter comprises a target display area and a target display direction, and different bullet-screen comment types correspond to different display areas and display directions, and wherein determining the target display parameter of the to-be-displayed bullet-screen comment based on the subscription type and the bullet-screen comment type comprises:
    in response to determining that the subscription type is the same as the bullet-screen comment type, determining that the first user and the second user belong to a same user camp, and determining that the display direction of the to-be-displayed bullet-screen comment is a forward direction; and
    in response to determining that the subscription type is different from the bullet-screen comment type, determining that the first user and the second user do not belong to a same user camp, and determining that the display direction of the to-be-displayed bullet-screen comment is a reverse direction; and
    rendering the to-be-displayed bullet-screen comment in the target display area in the target live room based on the target display direction.

2. The method according to claim 1, wherein determining the target display parameter of the to-be-displayed bullet-screen comment based on the subscription type and the bullet-screen comment type further comprises:
    obtaining a bullet-screen comment track array, wherein the bullet-screen comment track array comprises a plurality of bullet-screen comment tracks in a bullet-screen comment display area in the target live room and a display direction corresponding to each bullet-screen comment track;
    determining a target bullet-screen comment track from the bullet-screen comment track array based on the display direction of the to-be-displayed bullet-screen comment and the display direction corresponding to each bullet-screen comment track; and
    determining the target display area based on the target bullet-screen comment track, and determining a display direction corresponding to the target bullet-screen comment track as the target display direction.

3. The method according to claim 2, wherein determining the target bullet-screen comment track from the bullet-screen comment track array based on the display direction of the to-be-displayed bullet-screen comment and the display direction corresponding to each bullet-screen comment track comprises:
- identifying whether a display direction corresponding to a current bullet-screen comment track is the same as the display direction of the to-be-displayed bullet-screen comment, wherein the current bullet-screen comment track is any one of bullet-screen comment tracks in the bullet-screen comment track array;
- in response to determining that the display direction corresponding to the current bullet-screen comment track is the same as the display direction of the to-be-displayed bullet-screen comment, determining the target bullet-screen comment track from the bullet-screen comment track array based on bullet-screen comment information in the current bullet-screen comment track; and
- in response to determining that the display direction corresponding to the current bullet-screen comment track is different from the display direction of the to-be-displayed bullet-screen comment, determining the target bullet-screen comment track based on an identification result indicating whether the current bullet-screen comment track is a designated bullet-screen comment track.

4. The method according to claim 3, wherein determining the target bullet-screen comment track based on the identification result indicating whether the current bullet-screen comment track is the designated bullet-screen comment track comprises:
- in response to determining that the current bullet-screen comment track is not the designated bullet-screen comment track, identifying whether a display direction corresponding to a next bullet-screen comment track of the current bullet-screen comment track is the same as the display direction of the to-be-displayed bullet-screen comment.

5. The method according to claim 3, wherein determining the target bullet-screen comment track based on the identification result indicating whether the current bullet-screen comment track is the designated bullet-screen comment track comprises:
- in response to determining that the current bullet-screen comment track is the designated bullet-screen comment track, if the to-be-displayed bullet-screen comment is a host bullet-screen comment, selecting a bullet-screen comment track whose display direction is a forward direction from the bullet-screen comment track array as the target bullet-screen comment track.

6. The method according to claim 3, wherein the bullet-screen comment information comprises a quantity of bullet-screen comments, and determining the target bullet-screen comment track from the bullet-screen comment track array based on the bullet-screen comment information in the current bullet-screen comment track comprises:
- identifying, based on the quantity of bullet-screen comments, whether there is a bullet-screen comment in the current bullet-screen comment track; and
- in response to determining that there is no bullet-screen comment in the current bullet-screen comment track, determining the current bullet-screen comment track as the target bullet-screen comment track.

7. The method according to claim 6, wherein after identifying, based on the quantity of bullet-screen comments, whether there is the bullet-screen comment in the current bullet-screen comment track, the method further comprises:
- in response to determining that there is a bullet-screen comment in the current bullet-screen comment track, determining whether a quantity of bullet-screen comments that have been rendered in the current bullet-screen comment track reaches a preset threshold; and
- in response to determining that the quantity of bullet-screen comments that have been rendered in the current bullet-screen comment track reaches the preset threshold, determining the target bullet-screen comment track based on the identification result indicating whether the current bullet-screen comment track is the designated bullet-screen comment track.

8. The method according to claim 7, wherein after determining whether the quantity of bullet-screen comments that have been rendered in the current bullet-screen comment track reaches the preset threshold, the method further comprises:
- in response to determining that the quantity of bullet-screen comments that have been rendered in the current bullet-screen comment track does not reach the preset threshold, determining whether a display time of the first character in the to-be-displayed bullet-screen comment is later than a display time of the last character in a target bullet-screen comment, wherein the target bullet-screen comment is the last bullet-screen comment that has been rendered in the current bullet-screen comment track; and
- in response to determining that the display time of the first character in the to-be-displayed bullet-screen comment is later than the display time of the last character in the target bullet-screen comment, determining the current bullet-screen comment track as the target bullet-screen comment track.

9. The method according to claim 7, wherein the bullet-screen comment information comprises a display direction of the bullet-screen comment, and before determining whether the quantity of bullet-screen comments that have been rendered in the current bullet-screen comment track reaches the preset threshold, the method further comprises:
- determining whether a display direction of the target bullet-screen comment is the same as the display direction of the to-be-displayed bullet-screen comment, wherein the target bullet-screen comment is the last bullet-screen comment that has been rendered in the current bullet-screen comment track; and
- the determining whether the quantity of bullet-screen comments that have been rendered in the current bullet-screen comment track reaches the preset threshold comprises:
  - in response to determining that the display direction of the target bullet-screen comment is the same as the display direction of the to-be-displayed bullet-screen comment, determining whether the quantity of bullet-screen comments that have been rendered in the current bullet-screen comment track reaches the preset threshold.

10. The method according to claim 1, wherein before obtaining the subscription type of the first user for the target live room and the bullet-screen comment type of the to-be-displayed bullet-screen comment in the target live room, the method further comprises:
- determining the bullet-screen comment display area in a live interface of the target live room;
- dividing the bullet-screen comment display area into a first display area and a second display area based on a bullet-screen comment display rule, wherein the first display area and the second display area correspond to different display directions;

determining a bullet-screen comment track in each of the first display area and the second display area based on a preset bullet-screen comment track width; and determining the bullet-screen comment track and a display direction corresponding to each bullet-screen comment track as a bullet-screen comment track array, wherein the display direction corresponding to each bullet-screen comment track is the same as a display direction corresponding to a display area in which each bullet-screen comment track is located.

11. The method according to claim 1, wherein before rendering the to-be-displayed bullet-screen comment in the target display area in the target live room based on the target display direction, the method further comprises:

determining a target rendering style of the to-be-displayed bullet-screen comment based on the bullet-screen comment type; and wherein rendering the to-be-displayed bullet-screen comment in the target display area in the target live room based on the target display direction comprises:
rendering the to-be-displayed bullet-screen comment in the target display area in the target live room based on the target display direction and the target rendering style.

12. A method, applied to a server, and comprising:
receiving a to-be-displayed bullet-screen comment from a first user in a current live room;
in response to determining that the current live room is a target live room with a subscription type, determining a bullet-screen comment type of the to-be-displayed bullet-screen comment, wherein the subscription type corresponds to a user camp, and different live videos are played in the target live room for users with different subscription types at a same time point; and
sending the to-be-displayed bullet-screen comment that carries the bullet-screen comment type to the target client of a second user, wherein the target client is a client that displays the target live room and a display direction of the to-be-displayed bullet-screen comment is determined based on whether a subscription type of the second user for the target live room is the same as the bullet-screen comment type, comprising:
in response to determining that the subscription type of the second user is the same as the bullet-screen comment type, determining that the first user and the second user belong to a same user camp, and determining that the display direction of the to-be-displayed bullet-screen comment is a forward direction; and
in response to determining that the subscription type of the second user is different from the bullet-screen comment type, determining that the first user and the second user do not belong to a same user camp, and determining that the display direction of the to-be-displayed bullet-screen comment is a reverse direction.

13. The method according to claim 12, wherein determining the bullet-screen comment type of the to-be-displayed bullet-screen comment comprises:
determining a subscription type, for the target live room, of the first user who sends the to-be-displayed bullet-screen comment; and
determining the bullet-screen comment type of the to-be-displayed bullet-screen comment based on the subscription type.

14. The method according to claim 12, further comprising:

obtaining the subscription type of the second user for the target live room;
obtaining a target live stream corresponding to the subscription type from a plurality of live streams based on the subscription type, wherein the plurality of live streams comprise different live streams in a same live time period; and
sending the target live stream to the target client.

15. A computing device, comprising:
one or more processors; and
a memory, storing one or more programs configured to be executed by the one or more processors, the one or more programs comprising instructions for:
obtaining a subscription type of a first user for a target live room and a bullet-screen comment type of a to-be-displayed bullet-screen comment from a second user in the target live room, wherein the subscription type corresponds to a user camp, and different live videos are played in the target live room for users with different subscription types at a same time point;
determining a target display parameter of the to-be-displayed bullet-screen comment based on the subscription type and the bullet-screen comment type, wherein the target display parameter comprises a target display area and a target display direction, and different bullet-screen comment types correspond to different display areas and display directions, and wherein determining the target display parameter of the to-be-displayed bullet-screen comment based on the subscription type and the bullet-screen comment type comprises:
in response to determining that the subscription type is the same as the bullet-screen comment type, determining that the first user and the second user belong to a same user camp, and determining that the display direction of the to-be-displayed bullet-screen comment is a forward direction; and
in response to determining that the subscription type is different from the bullet-screen comment type, determining that the first user and the second user do not belong to a same user camp, and determining that the display direction of the to-be-displayed bullet-screen comment is a reverse direction; and
rendering the to-be-displayed bullet-screen comment in the target display area in the target live room based on the target display direction.

16. The computing device according to claim 15, wherein determining the target display parameter of the to-be-displayed bullet-screen comment based on the subscription type and the bullet-screen comment type further comprises:
obtaining a bullet-screen comment track array, wherein the bullet-screen comment track array comprises a plurality of bullet-screen comment tracks in a bullet-screen comment display area in the target live room and a display direction corresponding to each bullet-screen comment track;
determining a target bullet-screen comment track from the bullet-screen comment track array based on the display direction of the to-be-displayed bullet-screen comment and the display direction corresponding to each bullet-screen comment track; and
determining the target display area based on the target bullet-screen comment track, and determining a display direction corresponding to the target bullet-screen comment track as the target display direction.

17. The computing device according to claim 16, wherein determining the target bullet-screen comment track from the bullet-screen comment track array based on the display direction of the to-be-displayed bullet-screen comment and the display direction corresponding to each bullet-screen comment track comprises:

identifying whether a display direction corresponding to a current bullet-screen comment track is the same as the display direction of the to-be-displayed bullet-screen comment, wherein the current bullet-screen comment track is any one of bullet-screen comment tracks in the bullet-screen comment track array;

in response to determining that the display direction corresponding to the current bullet-screen comment track is the same as the display direction of the to-be-displayed bullet-screen comment, determining the target bullet-screen comment track from the bullet-screen comment track array based on bullet-screen comment information in the current bullet-screen comment track; and in response to determining that the display direction corresponding to the current bullet-screen comment track is different from the display direction of the to-be-displayed bullet-screen comment, determining the target bullet-screen comment track based on an identification result indicating whether the current bullet-screen comment track is a designated bullet-screen comment track.

18. The computing device according to claim 17, wherein determining the target bullet-screen comment track based on the identification result indicating whether the current bullet-screen comment track is the designated bullet-screen comment track comprises:

in response to determining that the current bullet-screen comment track is not the designated bullet-screen comment track, identifying whether a display direction corresponding to a next bullet-screen comment track of the current bullet-screen comment track is the same as the display direction of the to-be-displayed bullet-screen comment.

* * * * *